(12) United States Patent
Takahashi

(10) Patent No.: US 7,386,770 B2
(45) Date of Patent: *Jun. 10, 2008

(54) INFORMATION REPRODUCTION APPARATUS FOR REPRODUCING DEFECT MANAGEMENT INFORMATION FROM DEFECT MANAGEMENT AREA SETS, AND AN INFORMATION RECORDING APPARATUS FOR REPLACING DEFECT MANAGEMENT INFORMATION

(75) Inventor: Hideki Takahashi, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/564,765

(22) Filed: Nov. 29, 2006

(65) Prior Publication Data

US 2007/0097814 A1 May 3, 2007

Related U.S. Application Data

(63) Continuation of application No. 10/803,967, filed on Mar. 19, 2004.

(30) Foreign Application Priority Data

Mar. 20, 2003 (JP) ............................. 2003-078473

(51) Int. Cl.
*G11C 29/00* (2006.01)
*G11B 20/10* (2006.01)

(52) U.S. Cl. ................ 714/710; 369/47.14; 369/47.15; 369/275.3

(58) Field of Classification Search ............ 369/47.14, 369/47.15, 275.3; 714/710; *G11B 5/09, G11B 7/24, 20/10; G11C 29/00*
See application file for complete search history.

(56) References Cited

U.S. PATENT DOCUMENTS

| | | | | |
|---|---|---|---|---|
| 6,205,099 | B1 * | 3/2001 | Sasaki et al. ............ | 369/53.17 |
| 6,741,534 | B1 * | 5/2004 | Takahashi et al. ....... | 369/47.14 |
| 6,782,488 | B1 * | 8/2004 | Park et al. ..................... | 714/8 |
| 6,804,797 | B2 * | 10/2004 | Ko et al. ...................... | 714/42 |

FOREIGN PATENT DOCUMENTS

| | | |
|---|---|---|
| JP | 9-213011 | 8/1997 |
| JP | 9-320204 | 12/1997 |
| JP | 10-83658 | 3/1998 |
| JP | 2000-149256 | 5/2000 |
| JP | 2000-293948 | 10/2000 |
| JP | 2000-298950 | 10/2000 |
| JP | 2001-291367 | 10/2001 |
| JP | 2002-288938 | 10/2002 |
| KR | 2002-0007298 | 1/2002 |

OTHER PUBLICATIONS

Standard ECMA-272, 2nd Edition, pp. 34 (16.2 Lead-In zone)-52 (17.8 Formatting of the disk), Jun. 1999.

* cited by examiner

*Primary Examiner*—A M Psitos
(74) *Attorney, Agent, or Firm*—Oblon, Spivak, McClelland, Maier & Neustadt, P.C.

(57) ABSTRACT

An information storage medium according to an aspect of this invention comprises a rewritable area, the rewritable area comprises a user area to store user data, and a defect management area to store defect management information used to manage defective areas on the rewritable area, the defect management area comprises first and second defect management reserved areas, the first defect management reserved area being used to store the defect management information in an initial state, and the second defect management reserved area being used to store the defect management information which is transited at a predetermined timing.

2 Claims, 26 Drawing Sheets

DDS/PDL

| BP | Contents | Number of bytes |
|---|---|---|
| 0 to 1 | DDS identifier (0A0Ah) | 2 bytes |
| 2 | Reserved | 1 byte |
| 3 | Disc certification flag | 1 byte |
| 4 to 7 | DDS/PDL update counter | 4 bytes |
| 8 to 9 | Number of Groups | 2 bytes |
| 10 to 11 | Number of zones | 2 bytes |
| 12 to 79 | Reserved | 68 bytes |
| 80 to 87 | Location of Primary spare area | 8 bytes |
| 88 to 91 | Location of LSN 0 | 4 bytes |
| 92 to 255 | Reserved | 164 bytes |
| 256 to 259 | Start LSN for Zone 0 | 140 bytes |
| 260 to 263 | Start LSN for Zone 1 | |
| ...... | ...... | |
| 392 to 395 | Start LSN for Zone 34 | |
| 396 to 399 | DMA rec-counter 1 | 4 bytes |
| 400 to 2047 | reserved | 1652 bytes |

FIG. 4

SDL

| BP | Contents | Number of bytes |
|---|---|---|
| 0 to 1 | SDS identifier (0002h) | 2 bytes |
| 2 to 3 | Reserved | 2 bytes |
| 4 to 7 | SDL update counter | 4 bytes |
| 8 to 11 | Start sector number of Supplementary spare area | 4 bytes |
| 12 to 15 | Total number of logical sectors | 4 bytes |
| 16 to 19 | DDS/PDL update counter | 4 bytes |
| 20 | Spare area full flags | 1 byte |
| 21 to 24 | DMA rec-counter 2 | 4 bytes |
| 25 to 26 | Number of entries in SDL | 2 bytes |
| 27 to 34 | The first SDL entry | 8 bytes |
| ...... | ...... | ...... |
| M to m+7 | The last SDL entry | 8 bytes |

FIG. 5

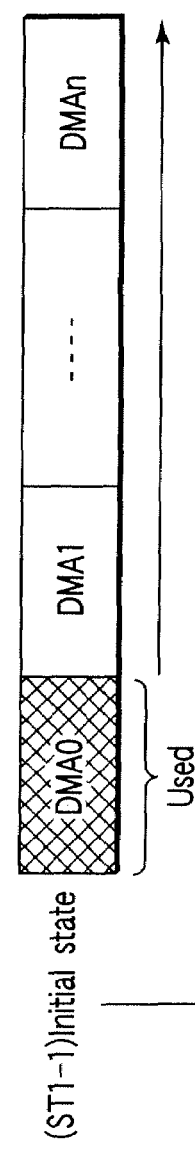
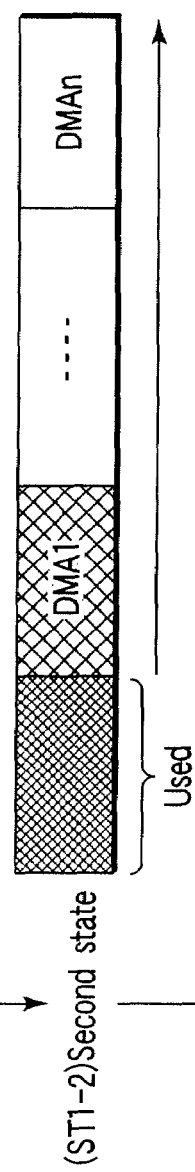
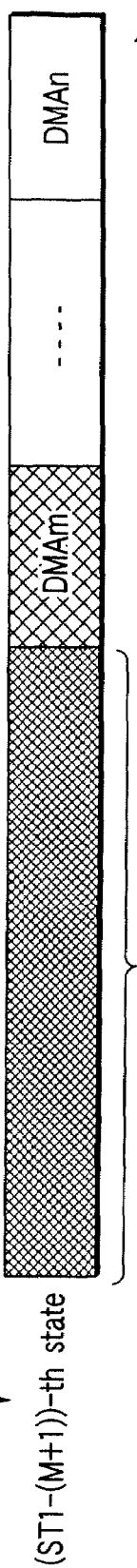
FIG. 6
FIG. 7

DMA use state 1

|  | DDS/PDL update counter | SDL update counter | DMA counter |
|---|---|---|---|
| DMA 0 | Normal use | Normal use | 0~Nov-1 |
| DMA 1 | Continuing use of above value | Continuing use of above value | 0~Nov-1 |
| ⋮ | Continuing use of above value | Continuing use of above value | 0~Nov-1 |
| DMA m | Continuing use of above value | Continuing use of above value | 0~Nov-1 |
| ⋮ | Continuing use of above value | Continuing use of above value | 0~Nov-1 |
| DMA n | Continuing use of above value | Continuing use of above value | 0~Nov-1 |

Nov : Allowable overwrite count

FIG. 8

DMA use state 2

|  | DDS/PDL update counter | SDL update counter | DMA counter |
|---|---|---|---|
| DMA 0 | Normal use | Normal use | 0~Nov-1 |
| DMA 1 | Normal use after reset | Normal use after reset | 0~Nov-1 |
| ⋮ | Normal use after reset | Normal use after reset | 0~Nov-1 |
| DMA m | Normal use after reset | Normal use after reset | 0~Nov-1 |
| ⋮ | Normal use after reset | Normal use after reset | 0~Nov-1 |
| DMA n | Normal use after reset | Normal use after reset | 0~Nov-1 |

Nov : Allowable overwrite count

FIG. 9

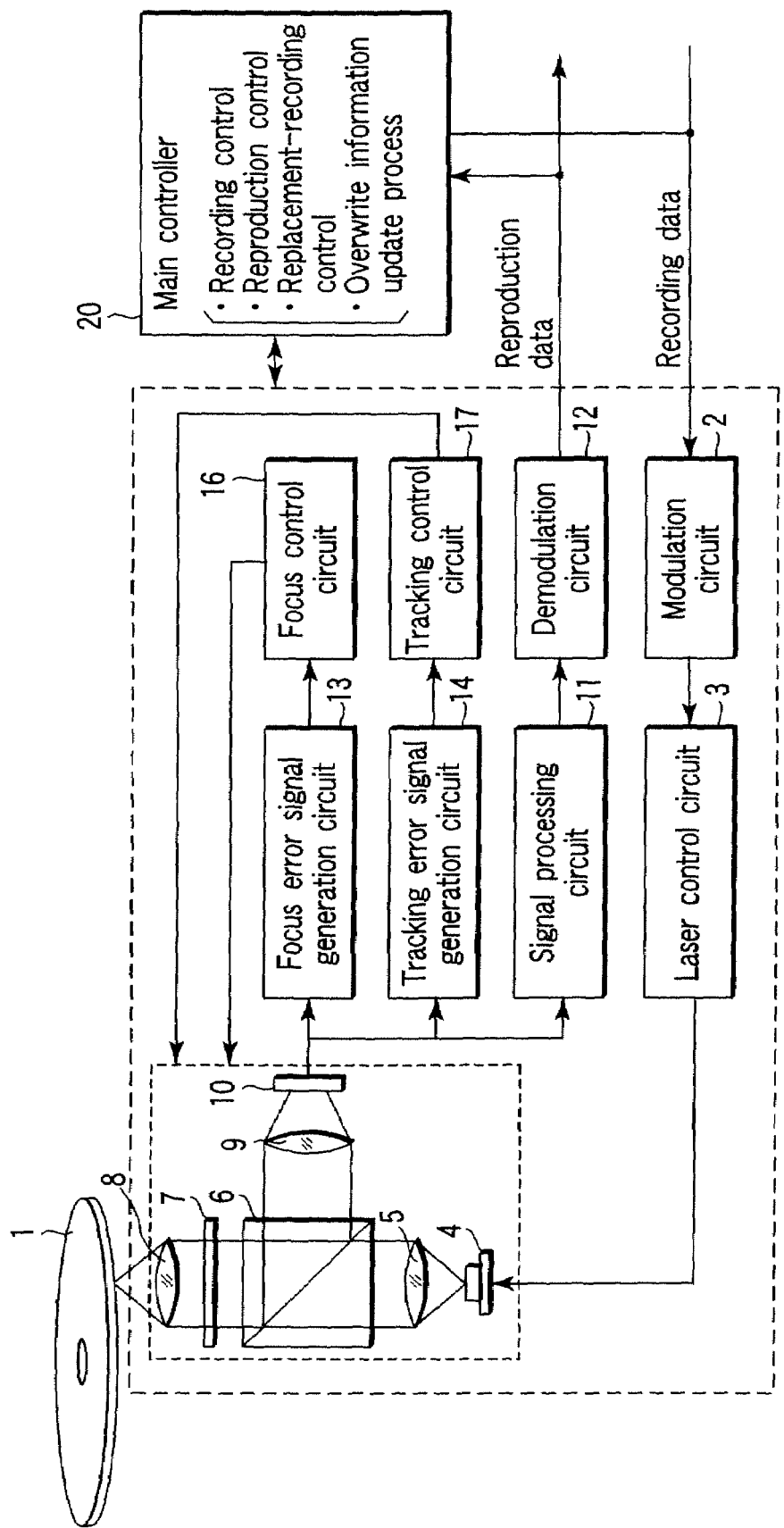
F I G. 15

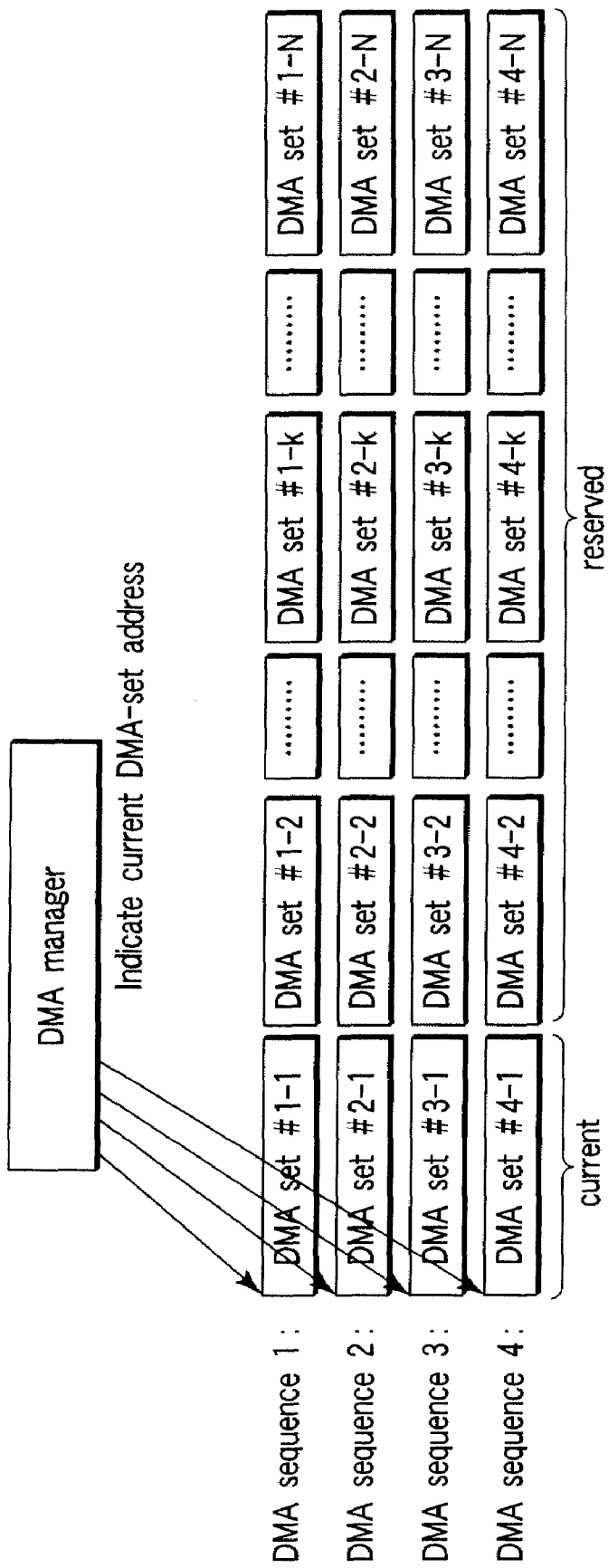
F I G. 16

| BP | Contents | Number of bytes |
|---|---|---|
| 0 to 1 | Identifier (0010h) | 2bytes |
| 2 to 7 | Reserved | 6bytes |
| 8 to 11 | First PSN of current DMA sequence 1 | 4bytes |
| 12 to 15 | First PSN of current DMA sequence 2 | 4bytes |
| 16 to 19 | First PSN of current DMA sequence 3 | 4bytes |
| 20 to 23 | First PSN of current DMA sequence 4 | 4bytes |
| 24 to 63 | Reserved | 40bytes |

| Each DMA | 2Blocks (DDS/PDL block and SDL block) |
|---|---|
| DMA set | 300Blocks=100set |
| Number of DMA set | 4Blocks (LI : 2, LO : 2) |
| Total Blocks for DMA | 1200Blocks (300blocks *4set) |
| Each DMA Manager | 1Block |
| Number of DMA Manager | 10Blocks |

F I G. 20

| | Normal | Abnormal | |
|---|---|---|---|
| Defective DMA | Defective | Not Defective (Readable) | Blank |
| Current DMA | Not Defective (Readable) | Defective | Blank |
| Reserved DMA | Blank | — | |

F I G. 24

| Case | head | body | tail | Comment |
|---|---|---|---|---|
| 1 | Reserved | Reserved | Reserved | Unformatted |
| 2 | Current | Reserved | Reserved | Initial |
| 3 | Defect | Current | Reserved | |
| 4 | Defect | Defect | Current | Last |
| 5 | Defect | Defect | Defect | All defect |

F I G. 25

| | Start Physical sector number | END Physical sector number | Number of Blocks | | | Start Physical sector number | END Physical sector number | Number of Blocks |
|---|---|---|---|---|---|---|---|---|
| Lead-in | | | | DMA Manager1-1 | DMA Manager2-1 | 4ED740 | 4ED75F | 1 |
| | 2CE00 | 2CE1F | 1 | reserved | reserved | 4ED760 | 4ED79F | 2 |
| | 2CE20 | 2CE5F | 2 | DMA manager1-2 | DMA manager2-2 | 4ED7A0 | 4ED7BF | 1 |
| | 2CE60 | 2CE7F | 1 | reserved | reserved | 4ED7C0 | 4ED7FF | 2 |
| | 2CE80 | 2CEBF | 2 | ......... | ......... | | | |
| | 2D160 | 2D17F | 1 | DMA manager1-10 | DMA manager2-10 | 4EDAA0 | 4EDABF | 1 |
| | 2D180 | 2D1BF | 2 | reserved | reserved | 4EDAC0 | 4EDAFF | 2 |
| | 2D1C0 | 2D1FF | 2 | DMA1-1 | DMA3-1 | 4EDB00 | 4EDB3F | 2 |
| | 2D200 | 2D21F | 1 | reserved | reserved | 4EDB40 | 4EDB5F | 1 |
| | 2D220 | 2D25F | 2 | DMA2-1 | DMA4-1 | 4EDB60 | 4EDB9F | 2 |
| | 2D260 | 2D27F | 1 | reserved | reserved | 4EDBA0 | 4EDBBF | 1 |
| | 2D280 | 2D2BF | 2 | DMA1-2 | DMA3-2 | 4EDBC0 | 4EDBFF | 2 |
| | 2D2C0 | 2D2DF | 1 | reserved | reserved | 4EDC00 | 4EDC1F | 1 |
| | 2D2E0 | 2D31F | 2 | DMA2-2 | DMA4-2 | 4EDC20 | 4EDC5F | 2 |
| | 2D320 | 2D33F | 1 | reserved | reserved | 4EDC60 | 4EDC7F | 1 |
| | | | | ......... | ......... | | | |
| | 2F500 | 2F53F | 2 | DMA1-48 | DMA3-48 | 4EFE40 | 4EFE7F | 2 |
| | 2F540 | 2F55F | 1 | reserved | reserved | 4EFE80 | 4EFE9F | 1 |
| | 2F560 | 2F59F | 2 | DMA2-48 | DMA4-48 | 4EFEA0 | 4EFEDF | 2 |
| | 2F5A0 | 2F5BF | 1 | reserved | reserved | 4EFEE0 | 4EFEFF | 1 |
| | 82CE00 | 82CE3F | 2 | DMA1-49 | DMA3-49 | CED740 | CED77F | 2 |
| | 82CE40 | 82CE5F | 1 | reserved | reserved | CED780 | CED79F | 1 |
| | 82CE60 | 82CE9F | 2 | DMA2-49 | DMA4-49 | CED7A0 | CED7DF | 2 |
| | 82CEA0 | 82CEBF | 1 | reserved | reserved | CED7E0 | CED7FF | 1 |
| | | | | ......... | ......... | | | |
| | 82F440 | 82F47F | 2 | DMA1-100 | DMA3-100 | CEFD80 | CEFDBF | 2 |
| | 82F480 | 82F49F | 1 | reserved | reserved | CEFDC0 | CEFDDF | 1 |
| | 82F4A0 | 82F4DF | 2 | DMA2-100 | DMA4-100 | CEFDE0 | CEFE1F | 2 |
| | 82F4E0 | 82F4FF | 1 | reserved | reserved | CEFE20 | CEFE3F | 1 |
| | | | | | Lead-out | | | |

FIG. 21

| BP | Contents | Number of bytes |
|---|---|---|
| 0 to 1 | PDL Identifier (0001h) | 2bytes |
| 2 to 3 | Number of entries in the PDL (EpDL) | 2bytes |
| 4 to 7 | The first PDL entry | 4bytes |
| 8 to 11 | The second PDL entry | 4bytes |
| ...... | ...... | ...... |
| n to n+3 | The last PDL entry | 4bytes | n=4∗EpDL

| BP | Contents | Number of bytes |
|---|---|---|
| 0 to 1 | SDL Identifier (0002h) | 2bytes |
| 2 to 3 | Reserved | 2bytes |
| 4 to 7 | SDL update counter | 4bytes |
| 8 to 11 | Start sector number of Supplementary spare area | 4bytes |
| 12 to 15 | Total number of logical sectors | 4bytes |
| 16 to 19 | DDS/PDL update counter | 4bytes |
| 20 | Spare area full flags | 1byte |
| 21 | Reserved | 1byte |
| 22 to 23 | Number of entries in SDL ($E_{SDL}$) | 2bytes |
| 24 to 31 | The first SDL entry | 8bytes |
| ...... | ...... | ...... |
| m to m+7 | The last SDL entry | 8bytes |

$m = 8 * E_{SDL} + 16$

FIG. 31

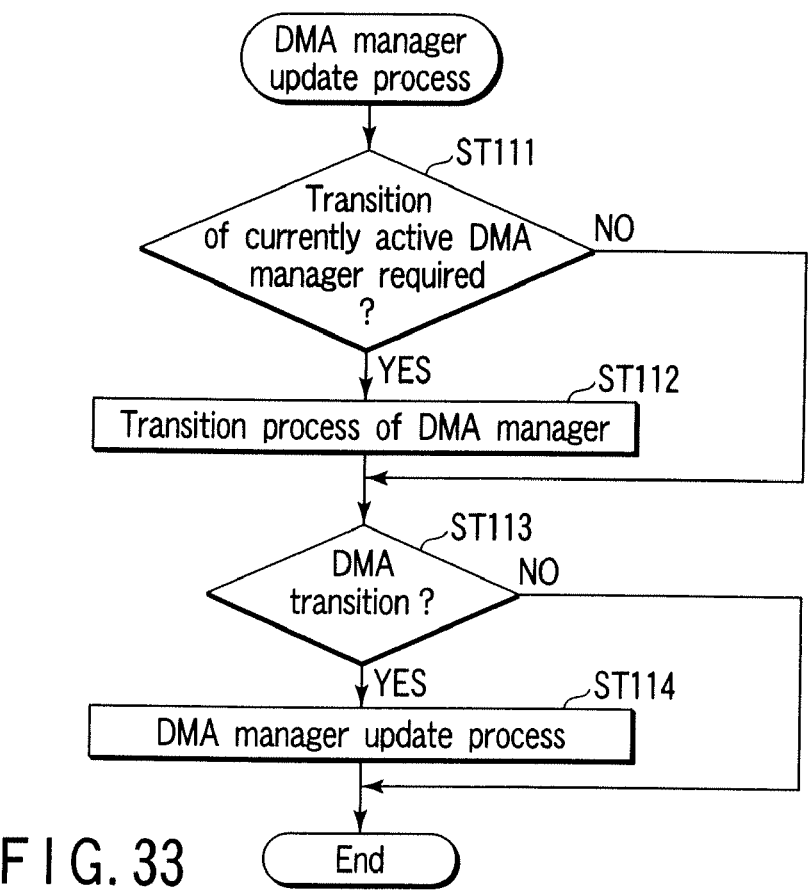

FIG. 33

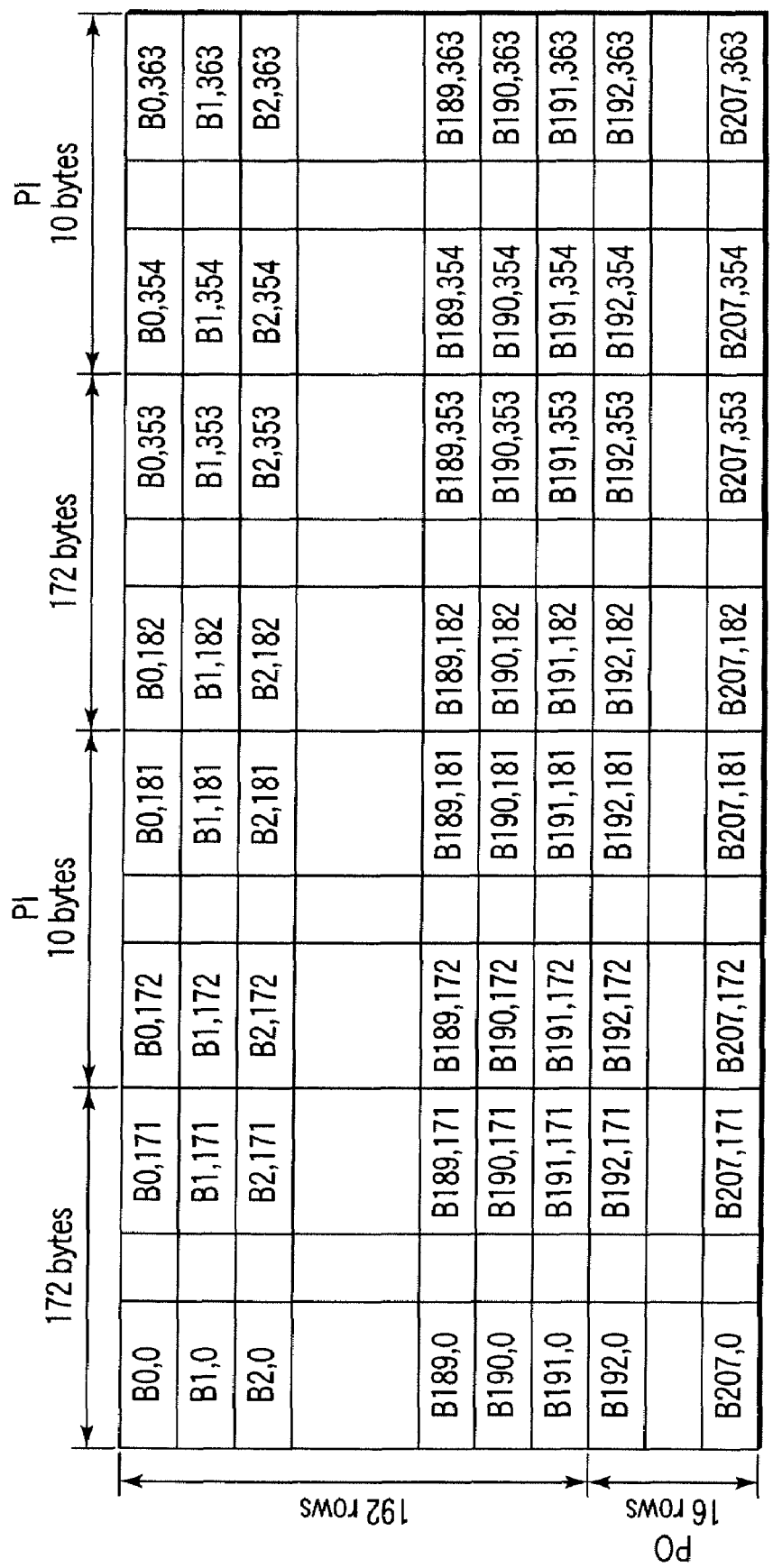
F I G. 35 (ECC block structure (D, E))

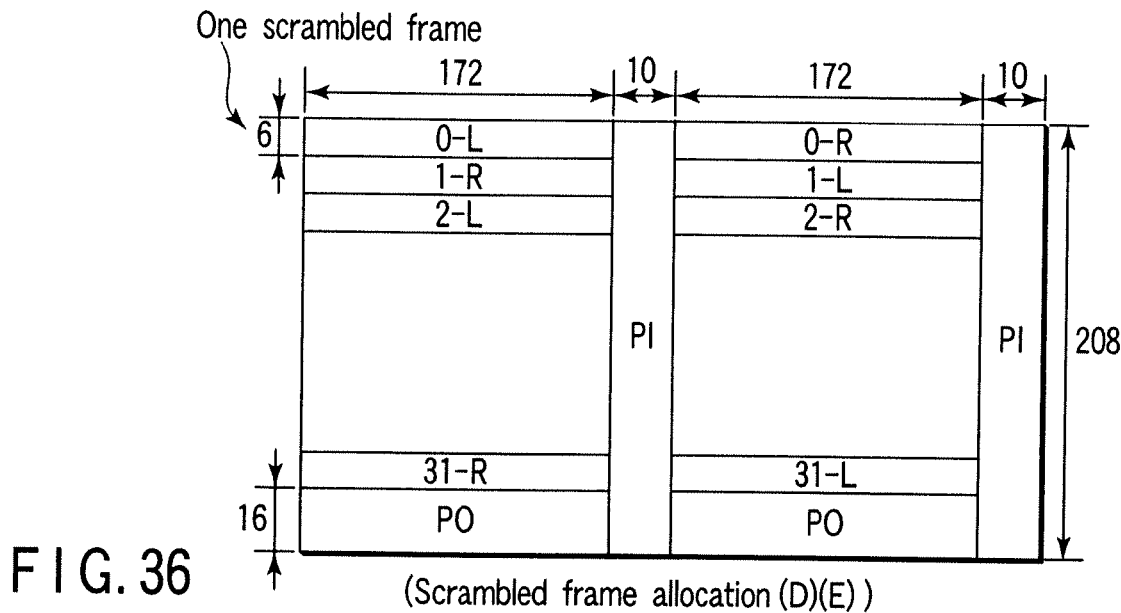
FIG. 36 (Scrambled frame allocation (D)(E))
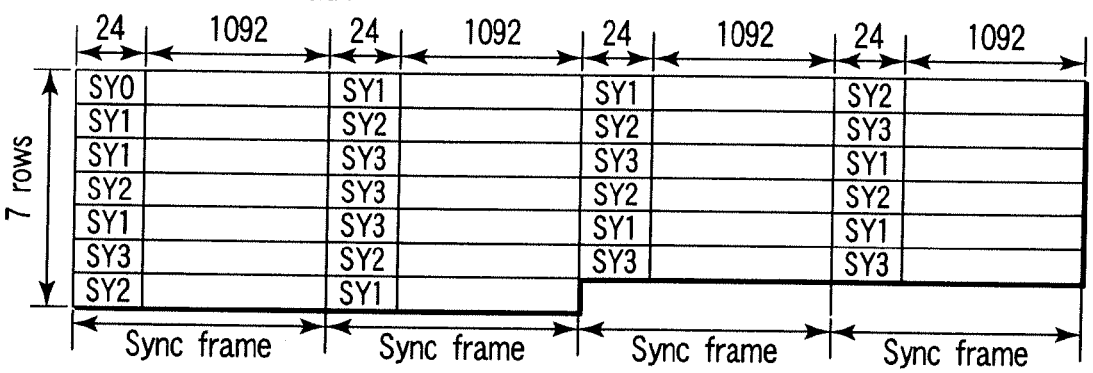
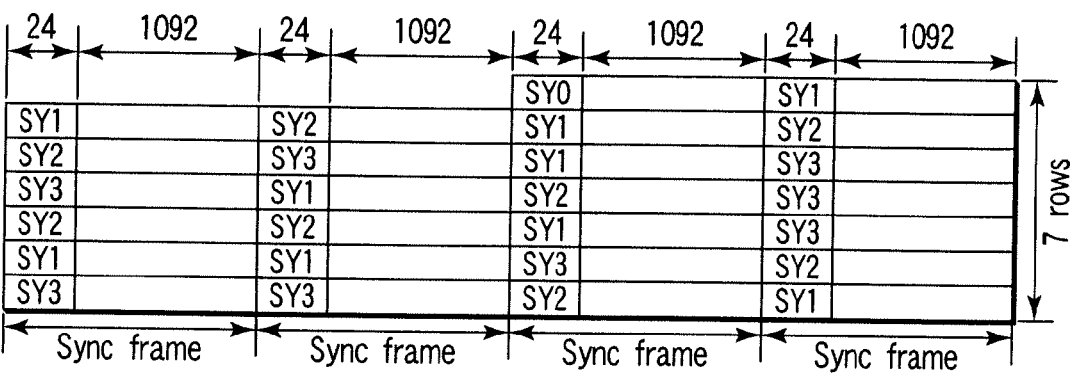
FIG. 38

INFORMATION REPRODUCTION APPARATUS FOR REPRODUCING DEFECT MANAGEMENT INFORMATION FROM DEFECT MANAGEMENT AREA SETS, AND AN INFORMATION RECORDING APPARATUS FOR REPLACING DEFECT MANAGEMENT INFORMATION

CROSS-REFERENCE TO RELATED APPLICATIONS

This application is based upon and claims the benefit of priority from prior Japanese Patent Application No. 2003-78473, filed Mar. 20, 2003, the entire contents of which are incorporated herein by reference. In addition, this application is a continuation Application of, and claims the benefit of priority under 35 U.S.C. §120 from U.S. Application Ser. No. 10/803,967, filed Mar. 19, 2004.

BACKGROUND OF THE INVENTION

1. Field of the Invention

The present invention relates to an information recording medium which comprises a defect management area for storing defect management information. The present invention also relates to an information reproduction apparatus and information reproduction method for reproducing user data by acquiring defect management information from an information recording medium. The present invention further relates to an information recording method for recording defect information on an information recording medium.

2. Description of the Related Art

An information storage medium such as an optical disk has a user area used to store user data, and has a mechanism for compensating for defects generated in this user area. Such mechanism is called a replacement process. An area that manages information associated with this replacement process, i.e., defect management information, is called a DMA (Defect Management Area).

Of information recording media, a DVD-RAM allows 100,000 or more overwrite accesses. Even when the DMA of such medium with very high overwrite durability undergoes tens of thousands of overwrite accesses, the reliability of the DMA does not drop.

For example, Jpn. Pat. Appln. KOKAI Publication No. 9-213011 discloses a technique for improving the DMA reliability by allocating a plurality of DMAs on an optical disk.

However, in the case of an information recording media having a relatively small allowable overwrite count (several ten to several thousand times), overwrite accesses to a DMA of such a medium poses a problem. That is, the DMA of such a medium is easily damaged by overwrite accesses.

This problem cannot be solved even by the technique disclosed in Jpn. Pat. Appln. KOKAI Publication No. 9-213011. That is, even when a plurality of DMAs are allocated, since respective DMAs undergo overwrite accesses at the same time, if one DMA is damaged by overwrite accesses, other DMAs are also damaged.

Each DMA stores defect management information, as described above, and if the DMA is damaged, defect management information cannot be read out from the DMA. As a result, the medium itself can no longer be used. Hence, it is demanded to improve the overwrite durability of the DMA.

BRIEF SUMMARY OF THE INVENTION

An information storage medium according to one aspect of the invention comprises a rewritable area, the rewritable area comprises a user area to store user data, and a defect management area to store defect management information used to manage defective areas on the rewritable area, the defect management area comprises first and second defect management reserved areas, the first defect management reserved area being used to store the defect management information in an initial state, and the second defect management reserved area being used to store the defect management information which is transited at a predetermined timing.

An information reproduction apparatus according to one aspect of the invention for reproducing information from an information storage medium, which comprises a rewritable area, comprises an acquisition unit configured to acquire latest defect management information used to manage defective areas on the rewritable areas from one of a plurality of defect management reserved areas contained in a defect management area on the rewritable area, and a reproduction unit configured to reproduce user data from a user area on the rewritable area on the basis of the latest defect management information.

An information reproduction method according to one aspect of the invention for reproducing information from an information storage medium, which comprises a rewritable area, comprises acquiring latest defect management information used to manage defective areas on the rewritable areas from one of a plurality of defect management reserved areas contained in a defect management area on the rewritable area, and reproducing user data from a user area on the rewritable area on the basis of the latest defect management information.

An information recording method according to one aspect of the invention for recording information on an information storage medium, which comprises a rewritable area, the rewritable area comprising a defect management area to store defect management information used to manage defective areas on the rewritable area, and the defect management area comprising first and second defect management reserved areas, the method comprises recording the defect management information on the first defect management reserved area in an initial state, and transiting the defect management information to the second defect management reserved area at a predetermined timing.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows an example of contents described in a first sector of a DDS/PDL block contained in the DMA;

FIG. 5 shows an example of contents described in an SDL block contained in the DMA;

FIG. 6 shows an example of the data structure of one of a plurality of SDL entries contained in an SDL;

FIG. 7 is a state transition chart for explaining an example of a method of using a DMA sequence;

FIG. 8 shows the relationship (part 1) between the states of counters allocated in DMAs and DMA transition;

FIG. 9 shows the relationship (part 2) between the states of counters allocated in DMAs and DMA transition;

FIG. 15 is a schematic block diagram showing the arrangement of an information recording/reproduction apparatus according to an embodiment of the present invention;

FIG. 16 depicts an image of an example of DMA management by a DMA manager;

FIG. 20 shows an example of the relationship between the DMA and ECC blocks;

FIG. 21 shows an example of the allocation of DMA managers and DMAs;

FIG. 24 shows an example of DMA conditions;

FIG. 25 shows an example of conditions of DMA reserved areas;

FIG. 31 shows an example of the contents of an SDL;

FIG. 33 is a flow chart showing an example of a DMA manager update process;

FIG. 35 shows an example of the data structure of an ECC block;

FIG. 36 shows an example of a scrambled frame allocation;

FIG. 38 shows an example of the data structure of recorded data fields.

DETAILED DESCRIPTION OF THE INVENTION

A preferred embodiment of the present invention will be described hereinafter with reference to the accompanying drawings.

Figure 1:
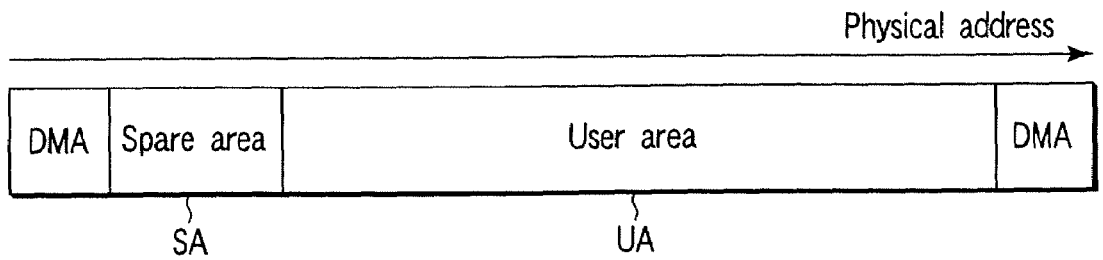
FIG. 1 shows an outline of the data structure of an information storage medium (optical disk) according to an embodiment of the present invention.

A first defect management method will be described hereinafter with reference to FIGS. 1 to 14. FIG. 1 shows an outline of the data structure of an information storage medium (optical disk) according to an embodiment of the present invention. As shown in FIG. 1, an information storage medium has a data structure which comprises a spare area SA and user area UA between DMAs. Note that the data structure shown in FIG. 1 is merely an example of that of the information storage medium of the present invention, and the data structure of the information storage medium of the present invention is not limited to such a specific data structure.

The user area UA is used to store user data. The spare area SA is an area where data to be recorded on a defective area present within the user area is replacement-recorded. The defective area is an area for respective ECC (Error Correction Code) blocks. That is, data for respective ECC blocks is replacement-recorded on the spare area SA. As will be described later, each DMA may comprise a DMA counter (overwrite management area). The overwrite count on the DMA is reflected on the count value of this DMA counter.

Figure 2:
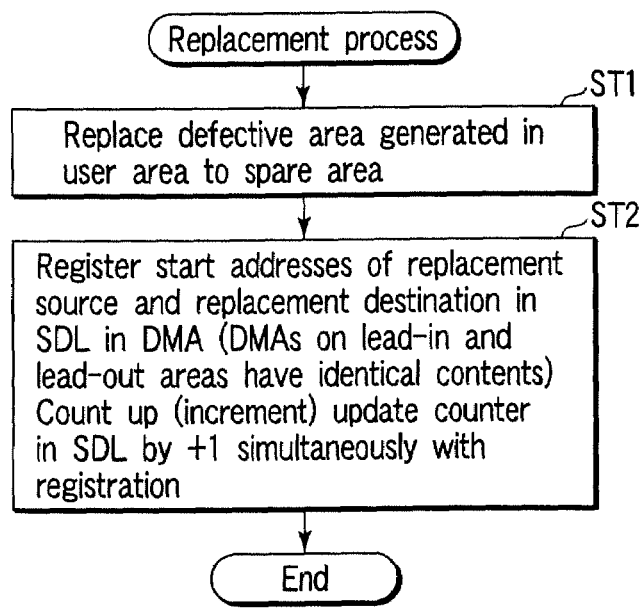
FIG. 2 is a flow chart showing an example of a replacement process.

FIG. 2 is a flow chart showing a replacement process. As shown in FIG. 2, data to be recorded on a defective area generated in the user area is replacement-recorded on the spare area SA (ST1). In addition, the start addresses of the replacement source (defective area) and replacement destination (a predetermined area in the spare area SA) are registered in an SDL (Secondary Defect List) in each DMA. The DMAs are allocated on the inner and outer peripheries of the information recording medium, as shown in, e.g., FIG. 1, and identical data is registered in the SDLs of both the DMAs. When information is registered in each SDL, an update counter of the SDL is incremented (+1) (ST2).

Conventionally, a DMA is allocated at a fixed physical address on a medium. Furthermore, in order to improve the fault tolerance of the DMA, DMAs that store identical contents are allocated at a plurality of locations on the medium. For example, in the case of a DVD-RAM, DMAs are allocated at two locations on the innermost periphery and two locations on the outermost periphery, i.e., a total of four locations, and these four DMAs record identical contents.

Figure 3:
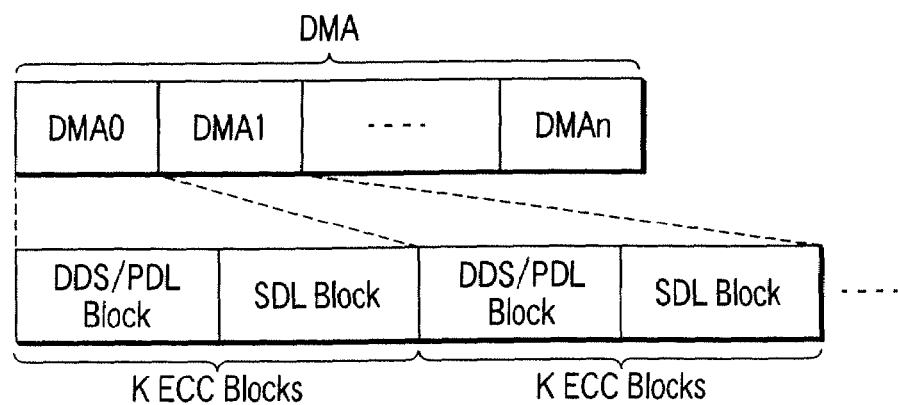
FIG. 3 shows an example of the data structure of a DMA allocated on the information storage medium.

FIG. 3 is a schematic view showing the data structure of DMAs allocated on the information storage medium of the present invention. As shown in FIG. 3, the information storage medium has a plurality of DMAs, each of which is made up of DDS/PDL blocks and SDL blocks. "PDL" is an abbreviation for Primary Defect List. Each of the DDS/PDL and SDL blocks corresponds to one ECC block (=32 KB). A case will be exemplified below wherein one ECC block consists of 32 KB, but one ECC block may consist of 64 KB. A 64 KB ECC block will be described in detail later.

In order to improve the fault tolerance of DMAs, when an active DMA has weakened, the information storage medium of the present invention is defined to shift defect management information stored in that DMA to a new DMA. It is determined that the DMA has weakened when the overwrite count of this DMA approaches an allowable overwrite count of the medium having the DMA, or when defects on this DMA increase, and error correction is more likely to fail.

Each DMA has a size of an integer multiple of that of an ECC block as a true recording unit in a drive. On a DVD-RAM, one ECC block consists of 16 sectors, and the size of one ECC block is 32 KB. A PDL is a primary defect registration list, and an SDL is a secondary defect registration list. The PDL registers defect management information associated with defects found in certification executed upon formatting a medium, i.e., primary defects. By contrast, the SDL registers defect management information associated with defects found upon normal recording (e.g., upon recording user data), i.e., secondary defects. The defect management information contains a replacement source address and replacement destination address. When the sizes of these lists increase, the number of defects that can be registered increase. DMA0 to DMAn are sequentially allocated, and are used in turn from DMA0.

FIG. 4 shows an example of contents described in the first sector of the DDS/PDL block contained in the DMA. On a predetermined area of the DDS/PDL block, a 4-byte DDS/PDL update counter, 4-byte DMA rec-counter 1, and the like are allocated.

Every time the contents of the DDS/PDL block are updated, the DDS/PDL update counter is incremented (+1). The DMA rec-counter 1 is counted up when the DDS/PDL block is rewritten. At the time of initialization (first time) of the medium, zero is set in all DMA rec-counters 1. A method of using this counter will be described later.

FIG. 5 shows an example of contents described in the SDL block contained in the DMA. On a predetermined area of the SDL block, a 4-byte SDL update counter, 4-byte DMA rec-counter 2, a plurality of SDL entries, and the like are allocated.

As in the DDS/PDL block, every time the contents of the SDL block are updated, the SDL update counter is incremented (+1). The DMA rec-counter 2 is counted up when the SDL block is rewritten. The SDL describes management information associated with secondary defects. At the time of initialization (first time) of the medium, zero is set in all DMA rec-counters 2. A method of using this counter will be described later.

FIG. 6 shows an example of the data structure of one of a plurality of SDL entries contained in the SDL. One SDL entry consists of, e.g., 8 bytes. On one SDL entry, a 3-byte field for describing the replacement source address, and a 3-byte field for describing the replacement destination address are allocated. A replacement process is done for, e.g., respective ECC blocks. The replacement source address field and replacement destination address field respectively register the addresses of first sectors contained in respective ECC blocks. In the example of the data structure shown in FIG. 6, 3-byte fields are assigned to designate addresses. However, when a medium has a larger capacity (larger address space), the address designation field size increases.

FIG. 7 is a state transition chart for explaining the method of using a DMA sequence. The DMA sequence comprises (n+1) DMAs from DMA0 to DMAn. If DMA0 is a currently active DMA, DMA1 to DMAn are auxiliary DMAs.

A plurality of DMAs included in the DMA sequence are used in turn from DMA0. In an initial state (ST1-1), DMA0 is used, and DMA1 and subsequent DMAs are not used. When defects on DMA0 increase, or when the overwrite count has exceeded a prescribed value, DMA0 becomes a used area, and defect management information stored in DMA0 is replaced to and recorded on DMA1 (ST2-1). Likewise, using DMAs in turn, even when each DMA has suffered defects or overwrite damage, the medium can be continuously used without breaking down as a system.

FIG. 8 shows the relationship (part 1) between the states of counters allocated in DMAs and DMA transition. The DDS/PDL update counter and SDL update counter shown in FIG. 8 are cumulative counters which cumulatively count even when DMA transition has occurred (even after transition of DMA0→DMA1).

As shown in FIG. 8, a DMA counter is allocated on a predetermined area of a DMA. This DMA counter is incremented when the DMA is rewritten. That is, a larger one of the count value of the DMA rec-counter 1 of the DDS/PDL block contained in the DMA and that of the DMA rec-counter 2 of the SDL block contained in the DMA is the count value of the DMA counter.

More specifically, by checking the count value of this DMA counter, the overwrite count of the currently active DMA can be detected. In other words, the count value of the DMA counter is a value indicating the level of damage that the DMA suffers upon overwrite accesses on the DMA.

An information recording/reproduction apparatus for recording information on this medium shifts the currently active DMA (e.g., DMA0) to an auxiliary DMA (e.g., DMA1) within the range of the allowable overwrite count (Nov) which is determined in accordance with the characteristics of a medium. Of course, in order to fully effectively use the currently active DMA, it is desirable to use that DMA until the maximum value (Nov−1) of the DMA counter. Even when the DMA counter does not reach its maximum value, the information recording/reproduction apparatus shifts the currently active DMA to an auxiliary DMA if it detects an increase of defects on the currently active DMA. Each DMA receives a value only after start of use. That is, no value is input to unused DMAs. When a medium is loaded to the information recording/reproduction apparatus, the information recording/reproduction apparatus searches for a DMA in which the count values of both DMA rec-counters 1 and 2 are zero, so as to detect the location of the currently active DMA. If a DMA (e.g., DMA2) in which the count values of both DMA rec-counters 1 and 2 are zero is found, the apparatus recognizes a DMA (e.g., DMA1) immediately before the found DMA as the currently active DMA. If no DMA in which the count values of both DMA rec-counters 1 and 2 are zero is found, the apparatus recognizes the last DMA (e.g., DMAn) as the currently active DMA.

FIG. 9 shows the relationship (part 2) between the states of counters allocated in DMAs and DMA transition. The case has been explained above with reference to FIG. 8 wherein the DDS/PDL update counter and SDL update counter cumulatively count even when DMA transition has occurred. By contrast, FIG. 9 will explain a case wherein the count values of the DDS/PDL update counter and SDL update counter are reset when DMA transition has occurred (after transition of DMA0→DMA1).

As shown in FIG. 9, a DMA counter is allocated on a predetermined area of a DMA. This DMA counter is incremented when the DMA is rewritten. That is, a larger one of the count value of the DDS/PDL update counter (DMA rec-counter 1) of the DDS/PDL block contained in the DMA and that of the SDL update counter (DMA rec-counter 2) of the SDL block contained in the DMA is the count value of the DMA counter.

In the case shown in FIG. 9, every time the DMA shifts, the DDS/PDL update counter and SDL update counter are reset. For this reason, the DDS/PDL update counter has a function equivalent to that of the DMA rec-counter 1, and the SDL update counter has a function equivalent to that of the DMA rec-counter 2. Therefore, in the case shown in FIG. 9, DMA rec-counters 1 and 2 may be omitted.

Figure 10:
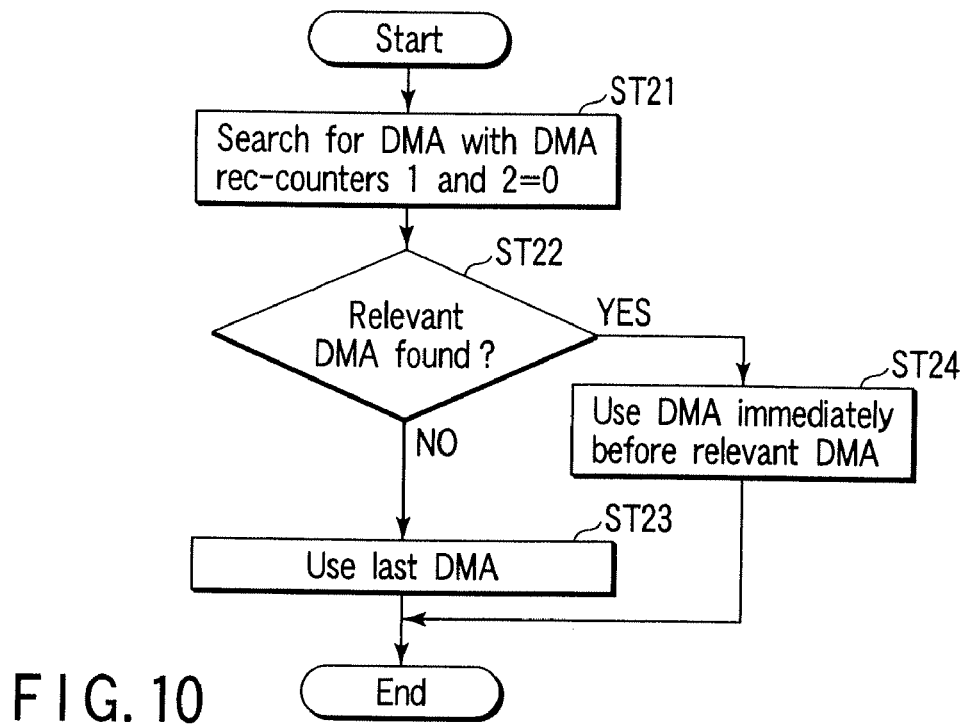
FIG. 10 is a flow chart showing an example of a sequence for searching for a currently active DMA.

FIG. 10 is a flow chart showing the sequence for searching for the currently active DMA. The search process for searching for the currently active DMA is executed by a main controller 20 of the information recording/reproduction apparatus shown in FIG. 15. As described above, the information storage medium of the present invention is defined to shift DMAs upon overwrite accesses and the like. Therefore, when a disk is loaded to the information recording/reproduction apparatus, the currently active DMA must be searched for. The DMA rec-counters 1 and 2 are allocated on each of DMAs (DMA0 to DMAn) on the medium. When the medium is initialized, the count values of the DMA rec-counters 1 and 2 of each DMA are set to zero. When use of the medium begins, the count values of the DMA rec-counters 1 and 2 of DMA1 are counted up. When use of the medium further continues, the count values of the DMA rec-counters 1 and 2 of DMA2 are counted up. The use order of DMA0 to DMAn is predetermined. That is, the DMAs are used in the order of DMA0→DMA1→DMA2→ . . . →DMAn. Hence, by checking the count values of the DMA rec-counters 1 and 2 of DMA0 to DMAn, the currently active DMA can be found out.

As shown in FIG. 10, when the medium is loaded to the information recording/reproduction apparatus, the information recording/reproduction apparatus searches for a DMA in which the count values of both DMA rec-counters 1 and 2 are zero, so as to detect the location of the currently active DMA (ST21). If a DMA (e.g., DMA2) in which the count values of both DMA rec-counters 1 and 2 are zero is found (ST22, YES), the apparatus recognizes a DMA (e.g., DMA1) immediately before the found DMA as the currently active DMA (ST24). If no DMA in which the count values of both DMA rec-counters 1 and 2 are zero is found (ST22, NO), the apparatus recognizes the last DMA (e.g., DMAn) as the currently active DMA (ST23).

Figure 11:
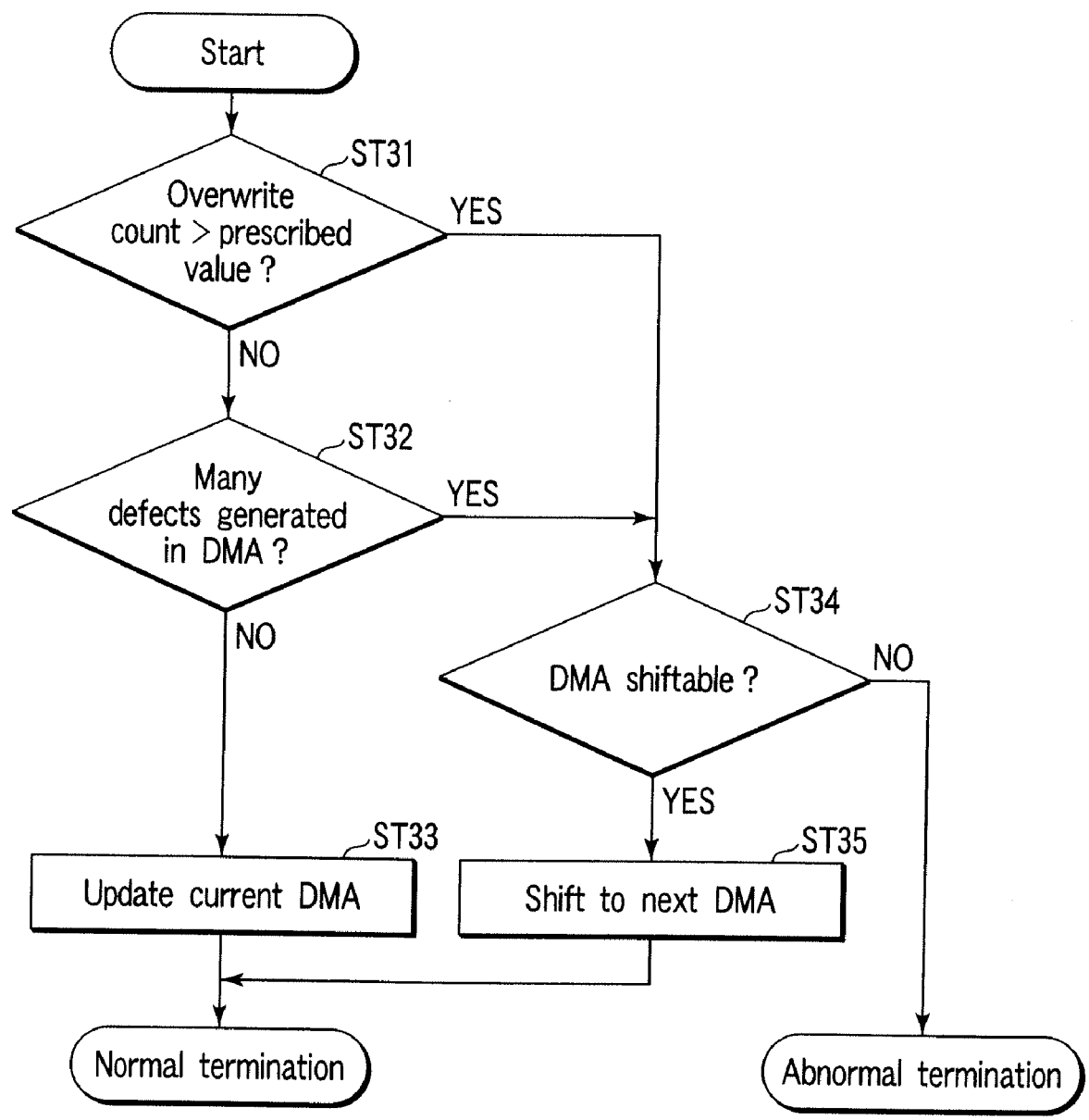
FIG. 11 is a flow chart for explaining an example of DMA registration and update processes.

FIG. 11 is a flow chart for explaining DMA registration and update processes. The DMA registration and update processes are executed by the main controller 20 of the information recording/reproduction apparatus shown in FIG. 15. The main controller 20 checks based on the count value of the DMA counter of the DMA if the rewrite count of the currently active DMA has exceeded a prescribed value (ST31). If it is determined that the rewrite count has exceeded the prescribed value (ST31, YES), the main controller 20 confirms if defect information stored in the currently active DMA can be shifted (if an auxiliary DMA remains). If it is determined that defect information can be shifted (ST34, YES), the main controller 20 shifts defect information stored in the currently active DMA to a DMA determined as the next shift destination (ST35). At this time, required values are taken over. For example, in the case shown in FIG. 8, the values of the DDS/PDL update counter and SDL update counter are taken over.

Even if the rewrite count is equal to or smaller than the prescribed value (ST31, NO), if the main controller 20 detects that many defects are generated in the DMA (ST32, YES), the controller 20 confirms if defect information stored in the currently active DMA can be shifted (if an auxiliary DMA remains). If it is determined that defect information can be shifted (ST34, YES), the main controller 20 shifts defect information stored in the currently active DMA to a DMA determined as the next shift destination (ST35). If it is determined that defect information cannot be shifted (ST34, NO), this process terminates abnormally.

If the rewrite count of the currently active DMA is equal to or smaller than the prescribed value (ST31, NO) and if the currently active DMA does not suffer defects (ST32, NO), the currently active DMA is updated as needed (ST33).

Figure 12:
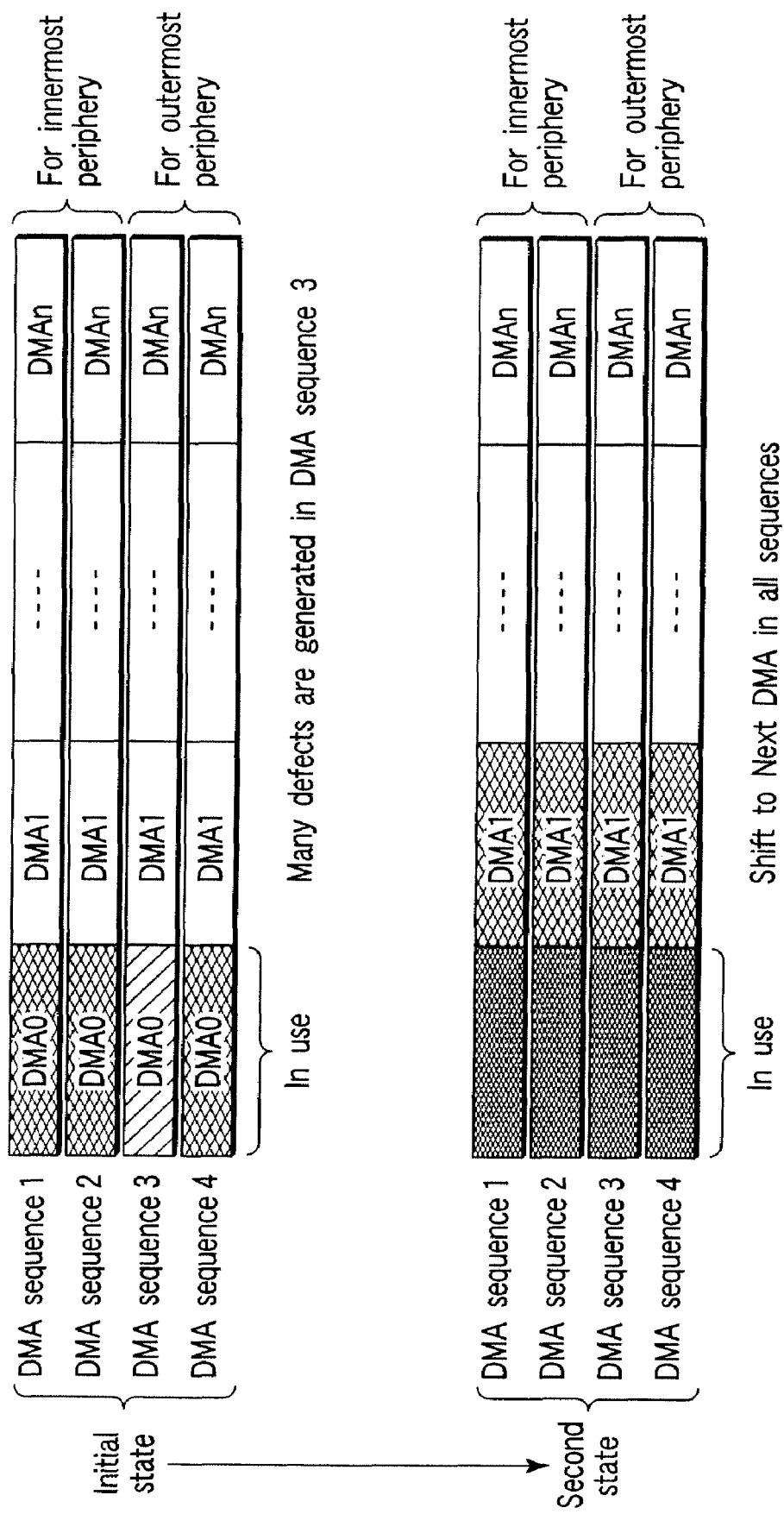
FIG. 12 is a state transition chart for explaining an example of a method of using a plurality of DMA sequences.

FIG. 12 is a state transition chart for explaining an example of a method of using a plurality of DMA sequences. As shown in FIG. 7, use of a single DMA sequence has been explained so far. That is, the case has been explained wherein one DMA sequence includes DMA0 to DMAn. In this case, use of a plurality of DMA sequences, as shown in FIG. 12, will be explained. That is, a case will be explained wherein each of a plurality of DMA sequences includes DMA0 to DMAn.

As shown in FIG. 12, for example, an information storage medium having four DMA sequences will be explained. The four DMA sequences are allocated at different locations. For example, DMA sequences 1 and 2 are allocated on the innermost periphery of the medium, and DMA sequences 3 and 4 are allocated on the outermost periphery of the medium. Assume that it is detected that many defects are generated in, e.g., DMA sequence 3 of DMA sequences 1 to 4 (initial state of FIG. 12). The main controller of the information recording/reproduction apparatus shown in FIG. 15 detects the presence of many defects. Upon detection of defects, defect management information in each of currently active DMAs (e.g., DMA0) in all the DMA sequences is shifted (undergoes replacement recording) to the next DMA (e.g., DMA1) (second state in FIG. 12). The main controller of the information recording/reproduction apparatus shown in FIG. 15 shifts (executes replacement recording of) the defect management information.

Figure 13:
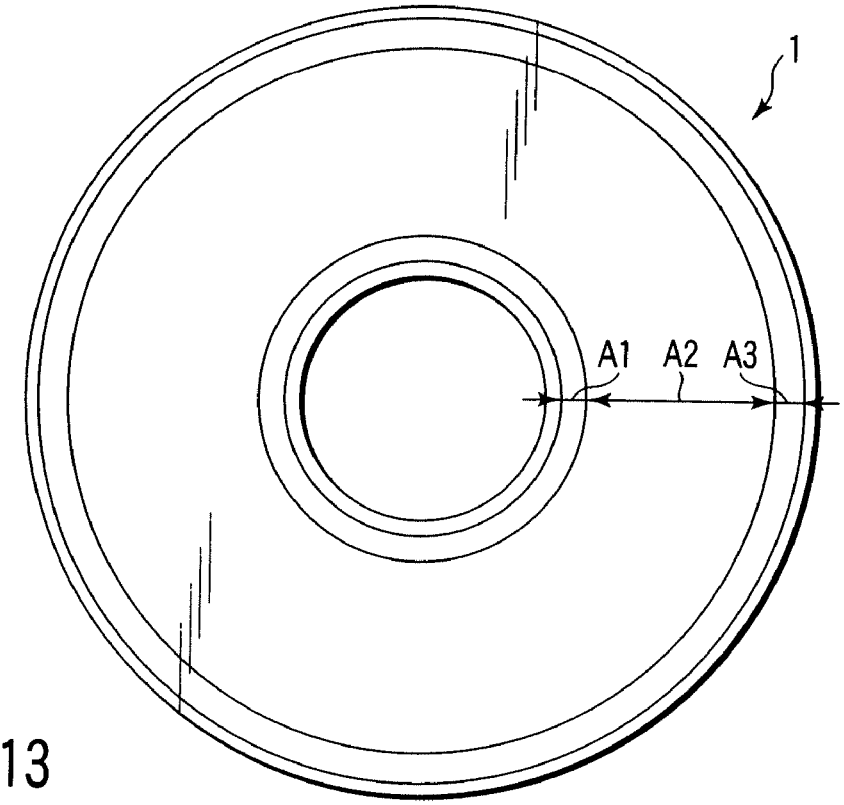
FIG. 13 is a view for explaining an example of lead-in and lead-out areas where a plurality of DMA sequences are allocated.

FIG. 13 is a view for explaining lead-in and lead-out areas where a plurality of DMA sequences are allocated. As shown in FIG. 13, a medium (optical disk) 1 has a lead-in area A1 on its innermost periphery, and a lead-out area A3 on its outermost periphery. Also, the medium 1 has a data area A2 between the lead-in and lead-out areas A1 and A3. The data area A2 has a user area UA and spare area SA.

The lead-in area A1 on the innermost periphery comprises first DMA sequences (DMA sequences 1 and 2), and the lead-out area A3 on the outermost periphery comprises second DMA sequences (DMA sequences 3 and 4). In this way, by allocating the DMA sequences on the innermost and outermost peripheries, a plurality of DMA sequences are allocated at physically separated locations. As a result, DMAs become invulnerable to failures.

Figure 14:
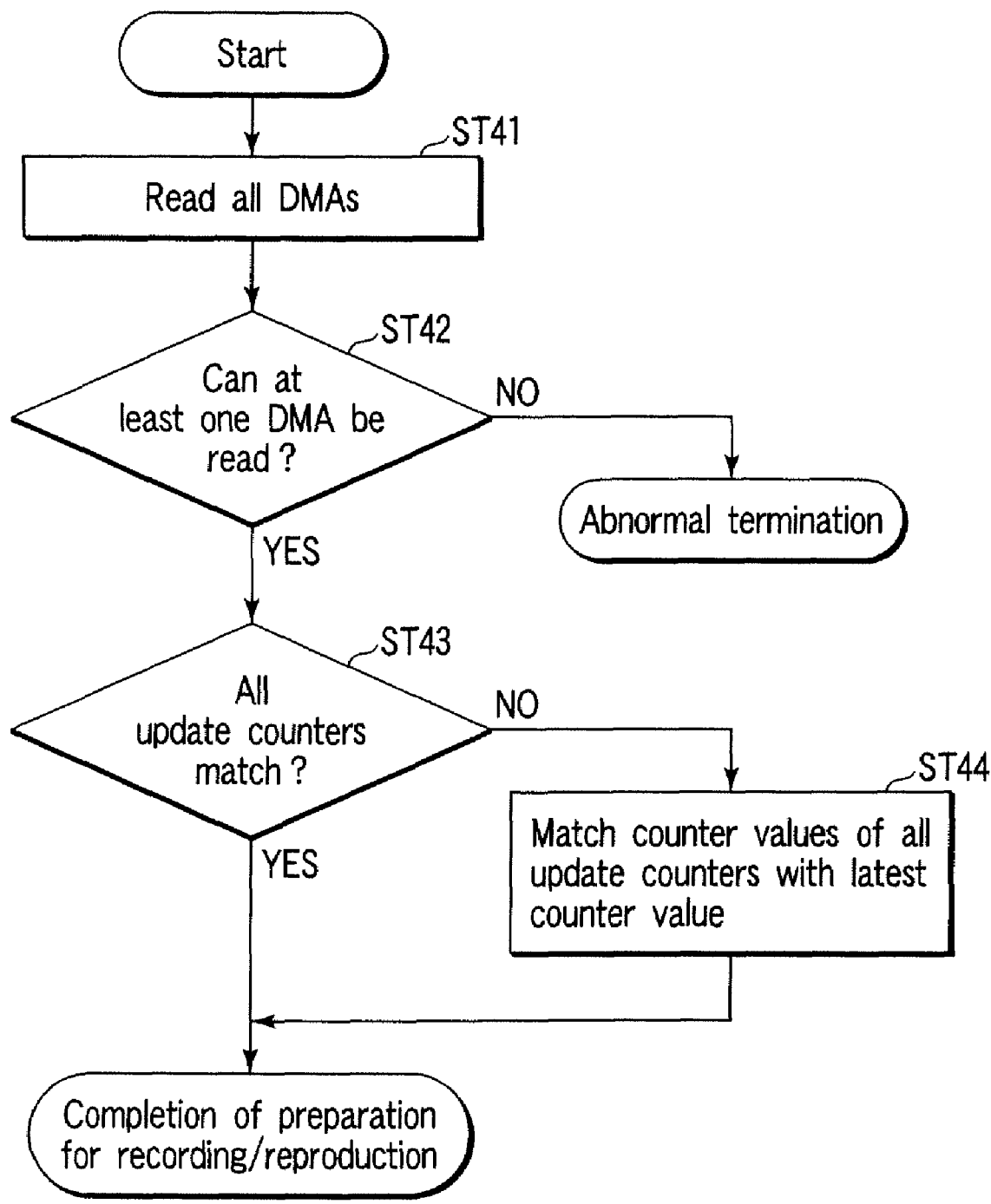
FIG. 14 is a flow chart showing an example of a reproduction process of a medium on which a plurality of DMA sequences are allocated.

FIG. 14 is a flow chart of a reproduction process of a medium on which a plurality of DMA sequences are allocated. When a medium is loaded to the information recording/reproduction apparatus shown in FIG. 15, the apparatus searches all DMA sequences for currently active DMAs, and reads out defect management information from the currently active DMAs (ST41). That is, in the case of, e.g., FIG. 12, the apparatus searches DMA sequence 1 for a currently active DMA (e.g., DMA1), DMA sequence 2 for a currently active DMA (e.g., DMA1), DMA sequence 3 for a currently active DMA (e.g., DMA1), and DMA sequence 4 for a currently active DMA (e.g., DMA1). The process for searching for the currently active DMA is as shown in FIG. 10.

If no defect management information can be read out from any of DMAs due to the influence of failures or the like (ST42, NO), this process terminates abnormally. If defect management information can be read out from the DMAs, the apparatus checks the count values of the DDS/PDL update counter and SDL update counter of each DMA. The currently active DMAs in the plurality of DMA sequences should record identical information. Therefore, the count values of the DDS/PDL update counters and SDL update counters of the respective DMAs should match. However, if any failure has occurred during a process of recording information on the respective DMAs in the plurality of DMA sequences in turn, some DMAs may remain unupdated. If the currently active DMAs in the plurality of DMA sequences have different count values of the update counters (ST43, NO), the unupdated DMAs match the DMAs having the latest count values (ST44). In this way, preparation for recording/reproduction is completed.

FIG. 15 shows a schematic arrangement of the information recording/reproduction apparatus according to an embodiment of the present invention. This information recording/reproduction apparatus records user data on the aforementioned medium (optical disk) 1, and reproduces user data recorded on the medium 1. Also, this information recording/reproduction apparatus executes a replacement process as needed.

As shown in FIG. 15, the information recording/reproduction apparatus comprises a modulation circuit 2, laser control circuit 3, laser 4, collimator lens 5, polarization beam splitter (to be referred to as a PBS hereinafter) 6, quarter wave plate 7, objective lens 8, focusing lens 9, photodetector 10, signal processing circuit 11, demodulation circuit 12, focus error signal generation circuit 13, tracking error signal generation circuit 14, focus control circuit 16, tracking control circuit 17, and main controller 20.

The main controller 20 controls a drive unit. The drive unit includes the modulation circuit 2, laser control circuit 3, laser 4, collimator lens 5, PBS 6, quarter wave plate 7, objective lens 8, focusing lens 9, photodetector 10, signal processing circuit 11, demodulation circuit 12, focus error signal generation circuit 13, tracking error signal generation circuit 14, focus control circuit 16, and tracking control circuit 17.

A data recording process of this information recording/reproduction apparatus will be described below. The data recording process is controlled by the main controller 20. Recording data (data symbol) is modulated to a predetermined channel bit sequence by the modulation circuit 2. The channel bit sequence corresponding to the recording data is converted into a laser drive waveform by the laser control circuit 3. The laser control circuit 3 pulse-drives the laser 4 to record data corresponding to a desired bit sequence on the medium 1. A recording laser beam emitted by the laser 4 is converted into collimated light by the collimator lens 5. The collimated light enters and is transmitted through the PBS 6. The beam transmitted through the PBS 6 passes through the quarter wave plate 7, and is focused on the information recording surface of the medium 1 by the objective lens 8. The focused beam is maintained in a state wherein it can form a best small spot on the recording surface, under the focus control of the focus control circuit 16 and the tracking control of the tracking control circuit 17.

A data reproduction process of this information recording/reproduction apparatus will be described below. The data reproduction process is controlled by the main controller 20. The laser 4 emits a reproduction laser beam on the basis of a data reproduction instruction from the main controller 20. The reproduction laser beam emitted by the laser 4 is converted into collimated light by the collimator lens 5. The collimated light enters and is transmitted through the PBS 6. The beam transmitted through the PBS 6 passes through the quarter wave plate 7, and is focused on the information recording surface of the medium 1 by the objective lens 8. The focused beam is maintained in a state wherein it can form a best small spot on the recording surface, under the focus control of the focus control circuit 16 and the tracking control of the tracking control circuit 17. At this time, the reproduction laser beam that strikes the medium 1 is reflected by a reflection film or reflective recording film in the information recording surface. The reflected light is transmitted through the objective lens 8 in the reverse direction, and is converted into collimated light again. The reflected light is transmitted through the quarter wave plate 7, and is reflected by the PBS 6 since it has a plane of polarization perpendicular to the incoming light. The beam reflected by the PBS 6 is converted into convergent light by the focusing lens 9, and enters the photodetector 10. The photodetector 10 comprises, e.g., a 4-split photodetector. The light beam that has entered the photodetector 10 is photoelectrically converted into an electrical signal, which is then amplified. The amplified signal is equalized and binarized by the signal processing circuit 11, and is then supplied to the demodulation circuit 12. The signal undergoes demodulation corresponding to a predetermined modulation method in the demodulation circuit 12, thus outputting reproduction data.

The focus error signal generation circuit 13 generates a focus error signal on the basis of some components of the electrical signal output from the photodetector 10. Likewise, the tracking error signal generation circuit 14 generates a tracking error signal on the basis of some components of the electrical signal output from the photodetector 10. The focus control circuit 16 controls focusing of a beam spot on the basis of the focus error signal. The tracking control circuit 17 controls tracking of a beam spot on the basis of the tracking error signal.

The replacement process of the main controller 20 will be described below. Upon formatting a medium, certification is executed. At this time, the main controller 20 detects defects on the medium. The main controller 20 records defect management information associated with defects detected at that time, i.e., primary defects, on the PDL in the DMA of that medium. The defect management information contains a replacement source sector address, and replacement destination sector address. In normal recording, the main controller 20 also detects defects on the medium. The main controller 20 records defect management information associated with defects detected at that time, i.e., secondary defects, on the SDL in the DMA of that medium. The defect management information contains the addresses of the first sectors of ECC blocks as the replacement source and destination. Based on the PDL and SDL, an access to the replacement source is considered as that to the replacement destination. The main controller 20 controls the search process of the currently active DMA shown in FIG. 10, the DMA registration and update processes shown in FIG. 11, the reproduction process shown in FIG. 14, and the like.

A second defect management method will be described hereinafter with reference to FIGS. 16 to 38. The second defect management method is defect management which follows that shown in FIG. 12, and further exploits a DMA manager. In the description of the second defect management method, contents that overlap those of the first defect management method shown in FIGS. 1 to 15 will refer to the already explained drawings, as needed.

An information storage medium of the present invention comprises a rewritable area, which comprises a plurality of DMA sequences, a plurality of manager storage areas, and a user area. On the medium shown in FIG. 13, the rewritable area is included in the lead-in area A1, data area A2, and lead-out area A3. The plurality of DMA sequences store identical defect management information. As a result, the fault tolerance of the DMAs can be improved.

Figure 17:
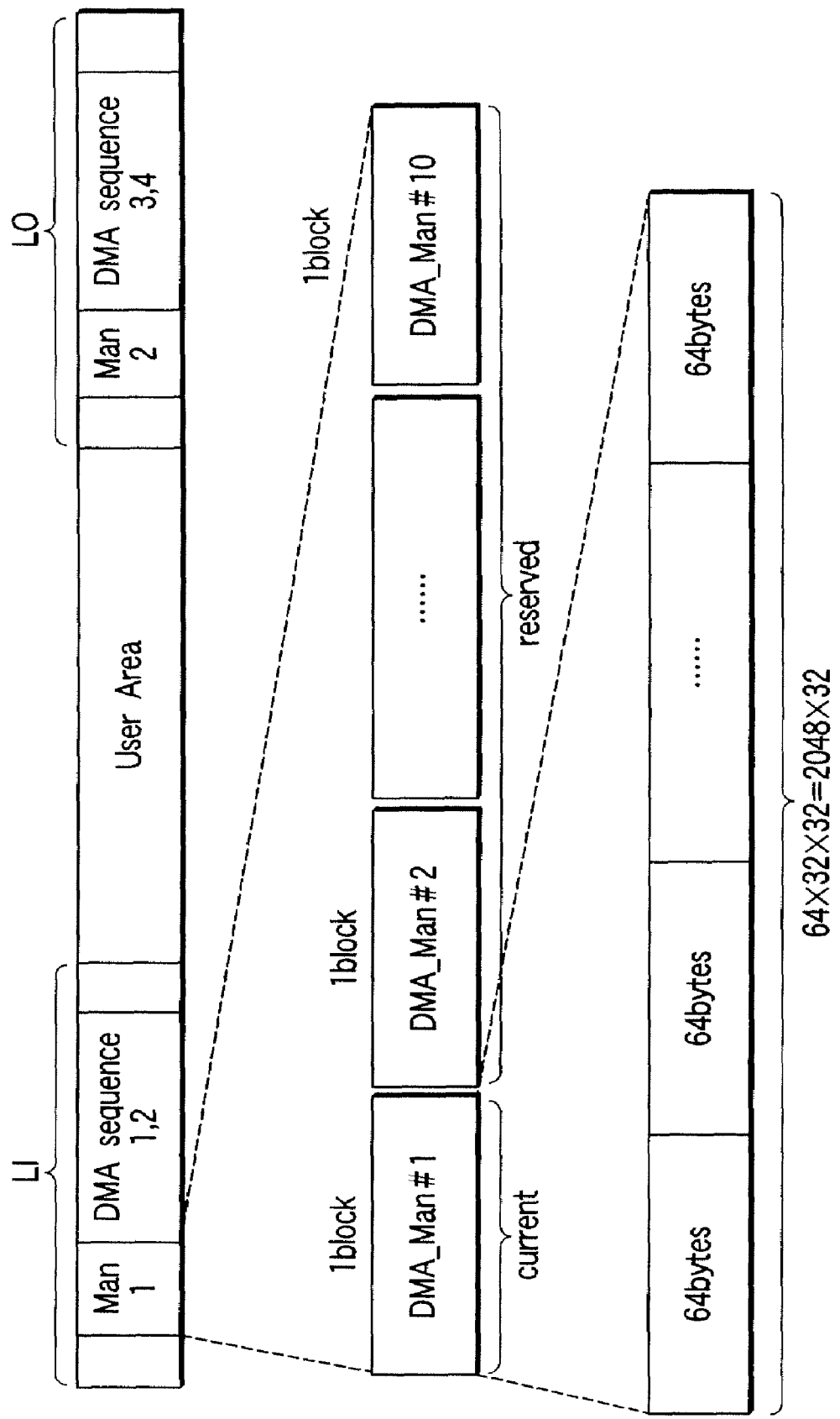
FIG. 17 shows an example of the allocation of DMAs and manager storage areas on a medium, and the data structure in each manager storage area.

As shown in FIGS. 16 and 17, for example, an information storage medium comprises DMA sequence 1, DMA sequence 2, DMA sequence 3, and DMA sequence 4. More specifically, DMA sequence 1 and DMA sequence 2 are allocated on the lead-in area A1 (lead-in area LI shown in FIG. 17) on the innermost periphery of the information storage medium shown in FIG. 13, and DMA sequence 3 and DMA sequence 4 are allocated on the lead-out area A3 (lead-out area LO shown in FIG. 17) on the outermost periphery of the information storage medium. The respective DMA sequences (DMA sequence 1, DMA sequence 2, DMA sequence 3, and DMA sequence 4) comprise a plurality of DMA reserved areas (DMA sets #1-1 to #1-N, DMA sets #2-1 to #2-N, DMA sets #3-1 to #3-N, and DMA sets #4-1 to #4-N). In an initial state, the first DMA reserved areas (DMA set #1-1, DMA set #2-1, DMA set #3-1, and DMA set #4-1) contained in the respective DMA sequences store current (latest) defect management information. If the first DMA reserved area (e.g., DMA set #1-1) contained in an arbitrary DMA sequence (e.g., DMA sequence 1) falls under a defective area, all pieces of defect management information stored in the first DMA reserved areas (DMA set #1-1, DMA set #2-1, DMA set #3-1, and DMA set #4-1) of all the DMA sequences (DMA sequence 1 to DMA sequence 4) are transited to the second DMA reserved areas (DMA set #1-2, DMA set #2-2, DMA set #3-2, and DMA set #4-2) of all the DMA sequences.

As described above, on the information storage medium of the present invention, currently active DMA reserved areas transit. Based on this, a DMA manager used to quickly search a plurality of DMA reserved areas for currently active DMA reserved areas is introduced. That is, the information storage medium of the present invention comprises manager storage areas for storing DMA managers, as shown in FIG. 17. Each DMA manager manages the addresses of the currently active DMA reserved areas. In other words, each manager storage area is a location information area for storing the location information of the currently active DMA reserved areas.

FIG. 16 shows address management of the currently active DMA reserved areas by the DMA manager. DMA sequence 1 comprises N DMA reserved areas (DMA set #1-1 to DMA set #1-N). Likewise, DMA sequence 2 comprises N DMA reserved areas (DMA set #2-1 to DMA set #2-N). Likewise, DMA sequence 3 comprises N DMA reserved areas (DMA set #3-1 to DMA set #3-N). Likewise, DMA sequence 4 comprises N DMA reserved areas (DMA set #4-1 to DMA set #4-N).

For example, assume that the first DMA reserved areas (DMA set #1-1, DMA set #2-1, DMA set #3-1, and DMA set #4-1) are currently active. In this case, the DMA manager has location information (addresses) indicating the positions (e.g., head positions) of the first DMA reserved areas (DMA set #1-1, DMA set #2-1, DMA set #3-1, and DMA set #4-1).

As shown in FIG. 17, for example, the manager storage areas (Man1, Man2) are respectively allocated on the lead-in and lead-out areas. The manager storage area (Man1) allocated on the lead-in area, and that (Man2) allocated on the lead-out area store identical information.

Furthermore, each of the manager storage areas (Man1, Man2) comprises a plurality of manager reserved areas. This is to take a measure against defects of the DMA manager. As shown in FIG. 17, one manager storage area (Man1) comprises 10 manager reserved areas (DMA_Man#1 to DMA_Man#10). Likewise, the other manager storage area (Man2) comprises 10 manager reserved areas (DMA_Man#1 to DMA_Man#10).

For example, in the initial stage, the first manager reserved areas (DMA_Man#1) contained in the respective manager storage areas (Man1, Man2) store the location information indicating the currently active DMA reserved areas. As a result of overwrite accesses, when the first manager reserved area (DMA_Man#1) contained in a given manager storage area (Man1) falls under a defective area, all pieces of location information stored in the first manager served areas (DMA_Man#1) of all the manager storage areas (Man1, Man2) are transited (transferred) to the second manager reserved areas (DMA_Man#2) of all the manager storage areas (Man1, Man2).

Note that the DMA manager has a lower rewrite frequency than DMAs. For this reason, the manager storage areas (Man1, Man2) that store the DMA managers, i.e., the manger reserved areas are unlikely to become defective areas as a result of overwrite accesses compared to the DMAs. However, the DMA manager cannot often be read out from the manager reserved area due to scratches, fingerprints, and the like. Hence, one DMA manager has a plurality of identical contents (the location information of the currently active DMAs). That is, identical contents are written in each manager reserved area a plurality of number of times. In this way, even when error correction as an ECC block has failed, data (location information of the currently active DMAs) can be read out.

One DMA manager is stored in one manager reserved area. The manager reserved area consists of one ECC block. In one ECC block that forms the manager reserved area, identical contents each of 64 bytes are written a plurality of times. Assume that one ECC block consists of 32 sectors. Also, assume that one sector consists of 2048 bytes. That is, assume that the size of one ECC block is 2048 bytes×32 sectors. In this case, 32 identical contents are recorded in each sector. That is, 32×32 identical contents are repetitively recorded in one ECC block. Even when there are too many defects to correct a full ECC block, correct information (location information of the currently active DMAs) is more likely to be read out as long as an ECC block can be partially corrected. ECC blocks will be described in detail later with reference to FIGS. 35 to 38.

The multiple write process in 64 bytes has been explained, but the present invention is not limited to such specific process. As shown in FIGS. 35 and 36, one data line in one ECC block is 172 bytes. Even when a full ECC block cannot undergo error correction, error correction may be made for respective 172-byte data lines. Focusing attention on this point, when identical information is written a plurality of number of times in a data size (e.g., 64 bytes) sufficiently smaller than 172 bytes, correct data can be obtained by error correction for respective data lines even when a full ECC block cannot undergo error correction.

Figures 18, 19:
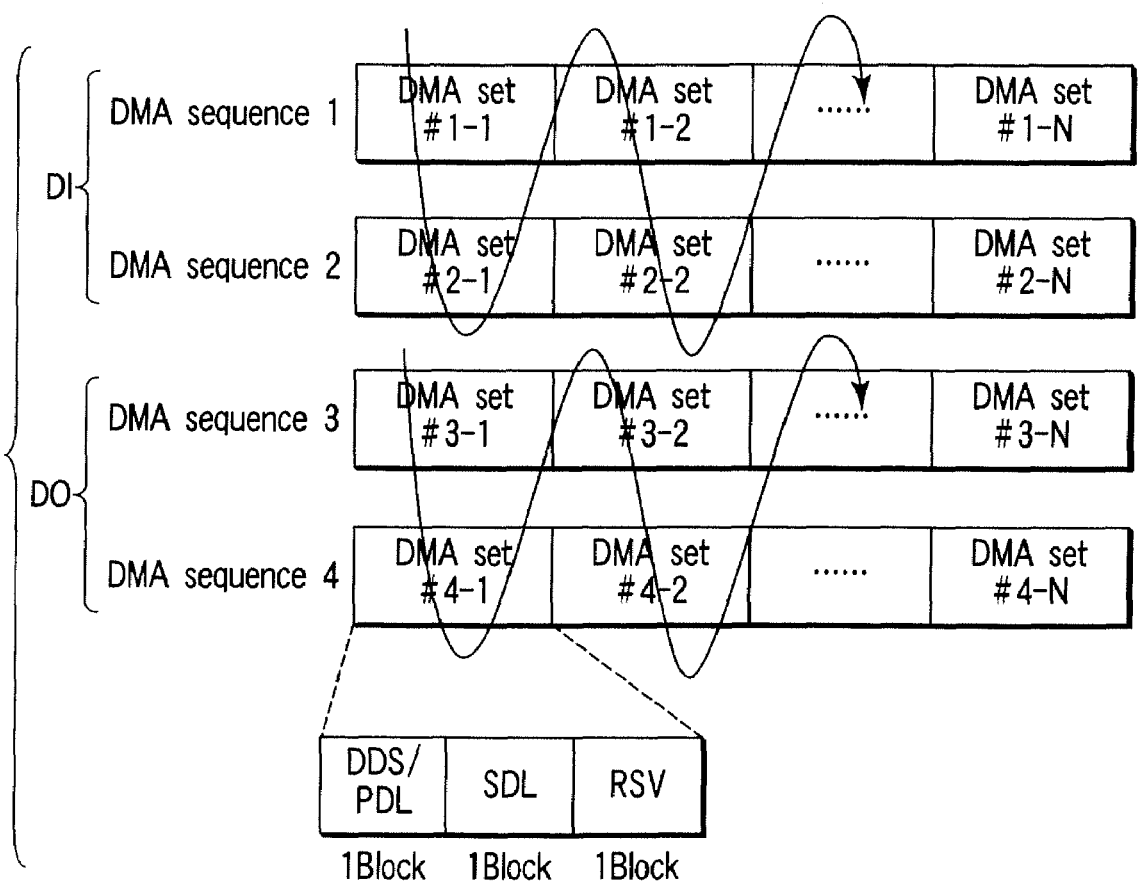
FIG. 18 shows an example of the data structure of a DMA manager stored in one manager reserved area in the manager storage area.
FIG. 19 shows an example of the allocation of DMA reserved areas contained in DMA sequence 1 to DMA sequence 4.

FIG. 18 shows an example of the DMA manager. As shown in FIG. 18, the DMA manager manages the addresses of the currently active, four DMA reserved areas. For example, the DMA manager manages the addresses of DMA set #1-1, DMA set #2-1, DMA set #3-1, and DMA set #4-1. Area numbers may be described in place of the addresses as long as the locations of the currently active DMA reserved areas can be uniquely specified.

FIG. 19 shows the configuration of the four DMA sequences (DMA sequence 1 to DMA sequence 4). FIG. 20 shows the relationship between the DMA and ECC blocks. As shown in FIG. 19, one DMA reserved area contains a DDS/PDL block SDL block, and RSV (reserved) block. The purpose of the RSV block is to avoid continued occurrence of defects by assuring a given physical distance between successive DMA reserved areas. That is, each DMA reserved area stores the DDS/PDL block and SDL block in practice, as shown in FIG. 20.

Figures 28, 30:
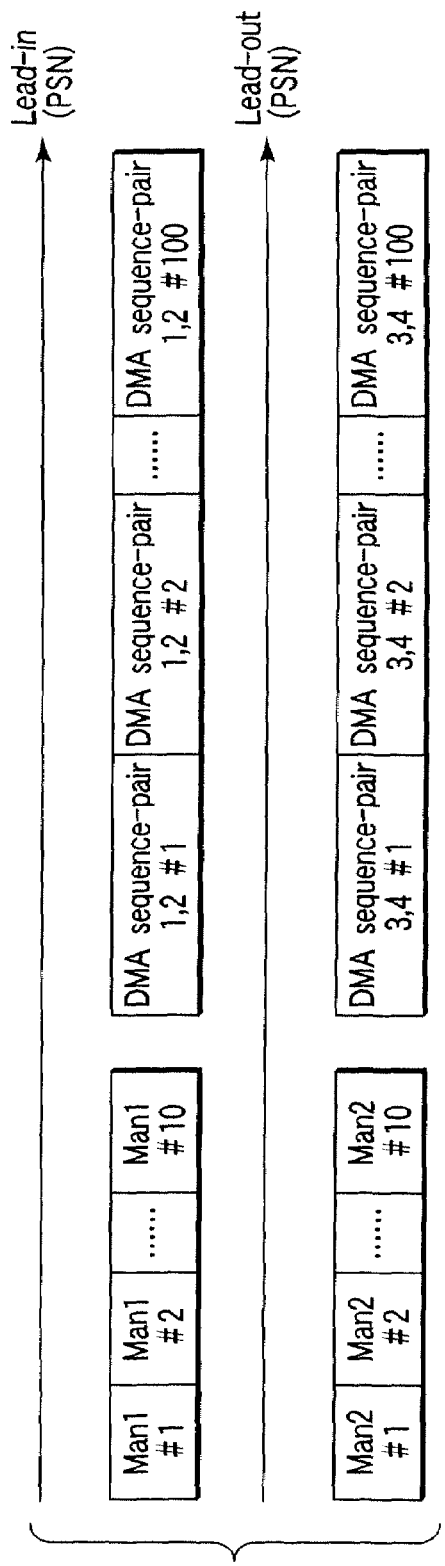
FIG. 28 shows an example of the physical allocation of manager storage areas and DMAs on lead-in and lead-out areas.
FIG. 30 shows an example of the contents of a PDL.

FIG. 30 shows the contents of the PDL. A maximum of 15871 PDL entries are allowed ((2048×31−4)/4=15871). FIG. 31 shows the contents of the SDL. A maximum of 8189 SDL entries are allowed ((2048×31−24)/8=8189).

Each of the DMA sequences (DMA sequence 1, DMA sequence 2, DMA sequence 3, and DMA sequence 4) comprises, e.g., 100 DMA reserved areas. That is, a total of 400 DMA reserved areas are assured. One DMA reserved area consists of three blocks, as described above. Therefore, a total of 1200 blocks are assured.

As described above, DMA sequence 1 and DMA sequence 2 are allocated on the lead-in area. The k-th DMA reserved areas contained in DMA sequence 1 and DMA sequence 2 record identical defect management information. That is, the k-th DMA reserved areas contained in DMA sequence 1 and DMA sequence 2 are used at the same time. More specifically, the k-th DMA reserved areas contained in DMA sequence 1 and DMA sequence 2 can be efficiently accessed when they are physically close to each other. Hence, the physical allocation in which the k-th DMA reserved areas contained in DMA sequence 1 and DMA sequence 2 are allocated to be close to each other is adopted.

Figure 27:
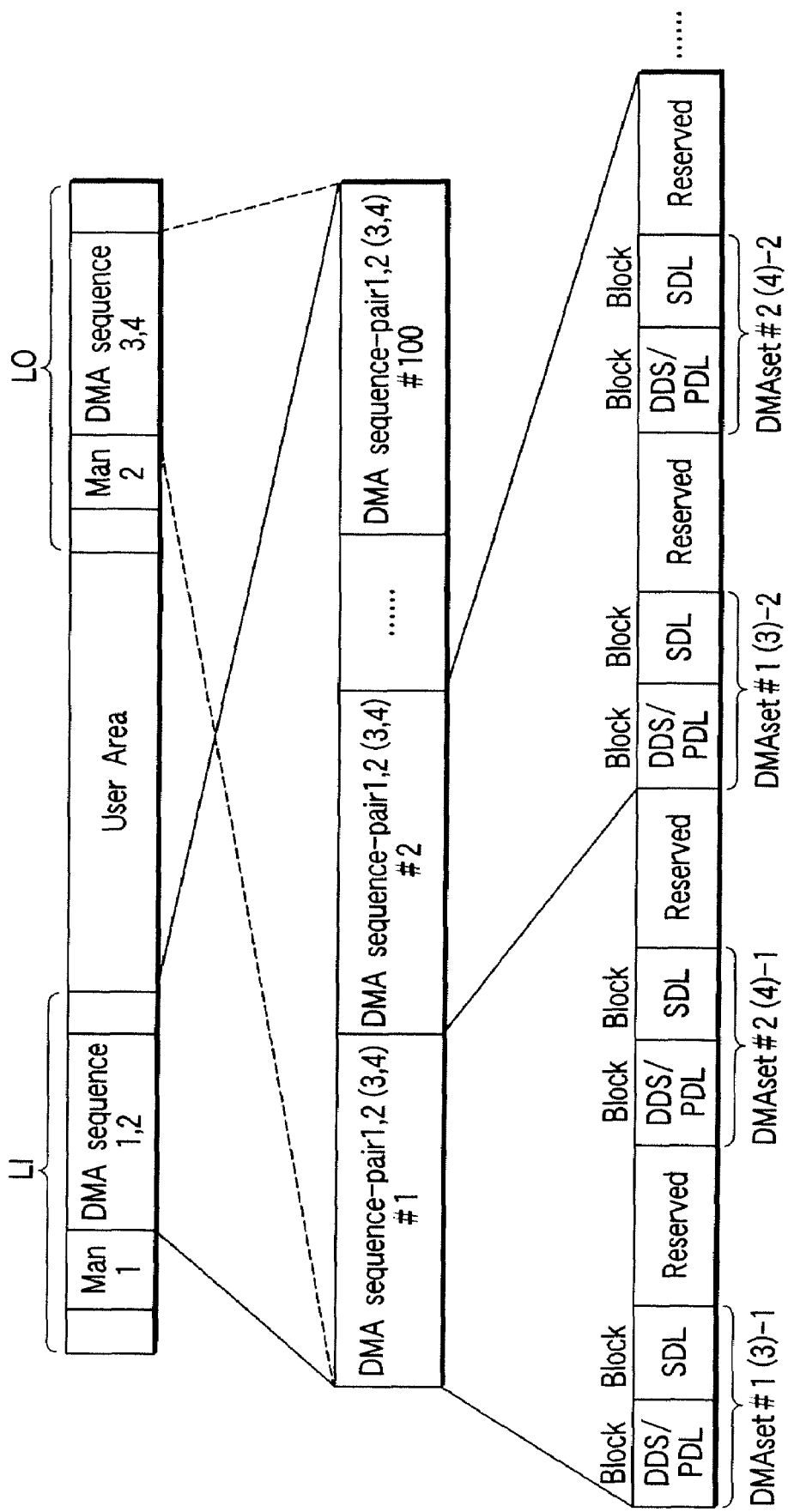
FIG. 27 shows an example of the allocation of DMAs and manager storage areas on a medium, and a sequence of DMA reserved areas contained in each DMA.

For example, as shown in FIGS. 19 and 27, the DMA reserved areas in DMA sequence 1 and DMA sequence 2 are allocated in the order of the first DMA reserved area (DMA set #1-1) contained in DMA sequence 1→the first DMA reserved area (DMA set #2-1) contained in DMA sequence 2→ the second DMA reserved area (DMA set #1-2) contained in DMA sequence 1→the second DMA reserved area (DMA set #2-2) contained in DMA sequence 2→ . . . → the N-th DMA reserved area (DMA set #1-N) contained in DMA sequence 1→ the N-th DMA reserved area (DMA set #2-N) contained in DMA sequence 2. With this allocation, the read-out time of defect management information from the currently active DMA reserved areas contained in DMA sequence 1 and DMA sequence 2 can be shortened. Furthermore, the time required for a transition process (transfer process) of defect management information for the DMA reserved areas contained in DMA sequence 1 and DMA sequence 2 can also be shortened.

The same applies to DMA sequence 3 and DMA sequence 4 allocated on the lead-out area. That is, as shown in FIG. 19, the DMA reserved areas in DMA sequence 3 and DMA sequence 4 are allocated in the order of the first DMA reserved area (DMA set #3-1) contained in DMA sequence 3→ the first DMA reserved area (DMA set #4-1) contained in DMA sequence 4→the second DMA reserved area (DMA set #3-2) contained in DMA sequence 3→the second DMA reserved area (DMA set #4-2) contained in DMA sequence 4→ . . . → the N-th DMA reserved area (DMA set #3-N) contained in DMA sequence 3→the N-th DMA reserved area (DMA set #4-N) contained in DMA sequence 4.

However, when the access speed is not that important, the respective DMA reserved areas may be allocated to be physically distant from each other. With this allocation, DMAs immune to causes of defects such as scratches, fingerprints, and the like can be formed. The physical allocation of DMA sequence 1 to DMA sequence 4 can be determined based on desired balance between the required access speed and reliability.

FIGS. 21 and 28 show the allocation of the DMA managers and DMAs. The DMA managers are stored in the manager reserved areas (DMA Manager 1-1 to DMA Manager 1-10) on the lead-in area, and those (DMA Manager 2-1 to DMA Manager 2-10) on the lead-out area. Two DMA sequences (DMA sequence 1, DMA sequence 2) are allocated on the lead-in area, and two DMA sequences (DMA sequence 3, DMA sequence 4) are allocated on the lead-out area.

Figure 22:
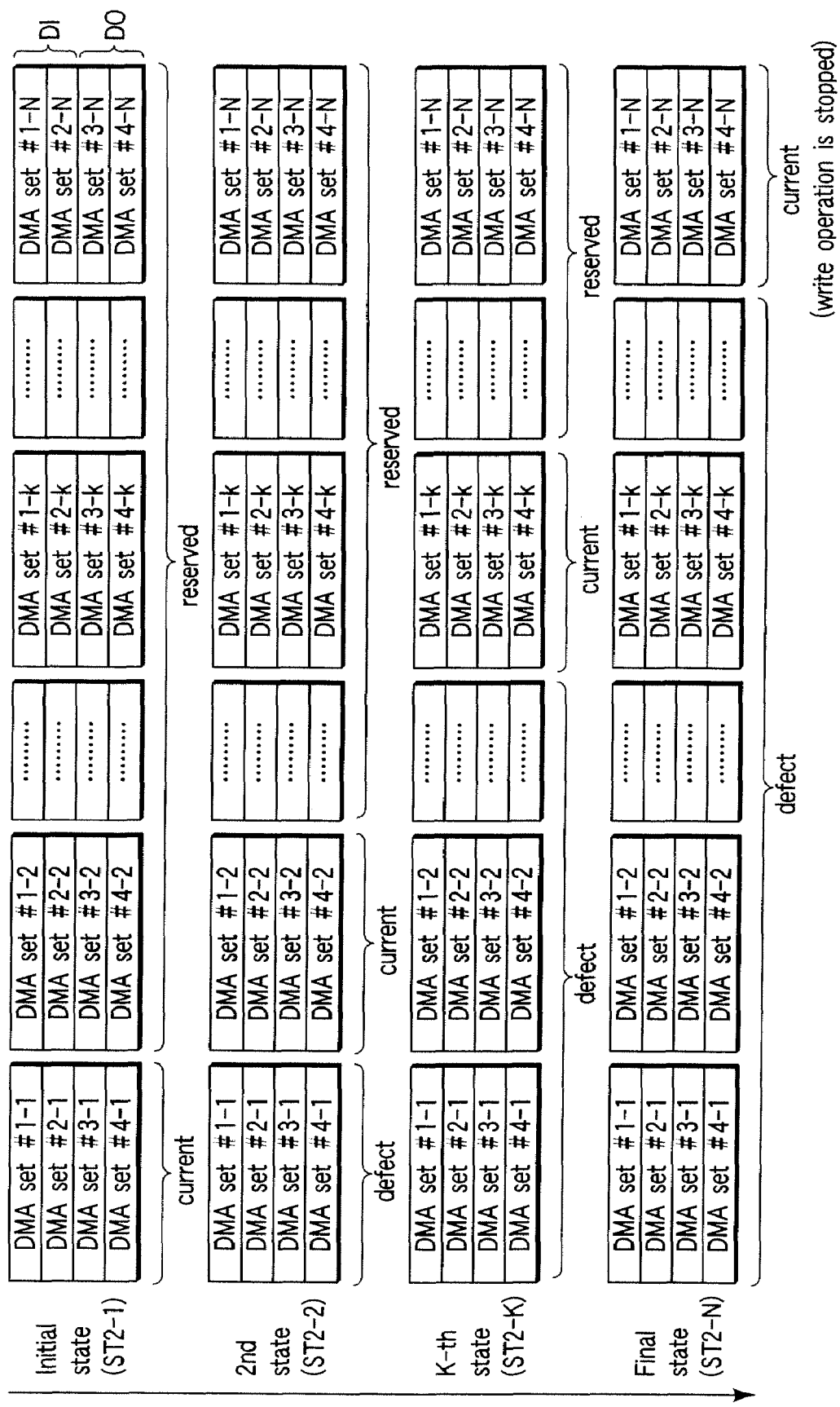
FIG. 22 shows an example of DMA transition.

FIG. 22 shows transition of the DMA sequences. As shown in FIG. 22, four DMA sequences transit at the same time. Compared to a case wherein each DMA sequence independently transits, the physical distance among DMA sequences can be prevented from being increased by transiting the four DMA sequences at the same time. As a result, access performance can be prevented from deteriorating. Also, easy recovery is allowed upon occurrence of any system failures.

In the initial state (ST2-1), the head (first) DMA reserved areas (DMA set #1-1, DMA set #2-1, DMA set #3-1, and DMA set #4-1) of the respective DMA sequences (DMA sequence 1, DMA sequence 2, DMA sequence 3, and DMA sequence 4) are activated. If one or more of the head DMA reserved areas (DMA set #1-1, DMA set #2-1, DMA set #3-1, and DMA set #4-1) of the respective DMA sequences fall under defective areas, transition of defect management information is made to the second DMA reserved areas (DMA set #1-2, DMA set #2-2, DMA set #3-2, and DMA set #4-2) of the respective DMA sequences (ST2-2). Likewise, transition of defect management information is made in turn. When the defect management information reaches the N-th DMA reserved areas (DMA set #1-N, DMA set #2-N, DMA set #3-N, and DMA set #4-N) of the respective DMA sequences, the recording operation is inhibited (ST2-N). After that, the medium is handled as a read-only medium.

Figure 23:
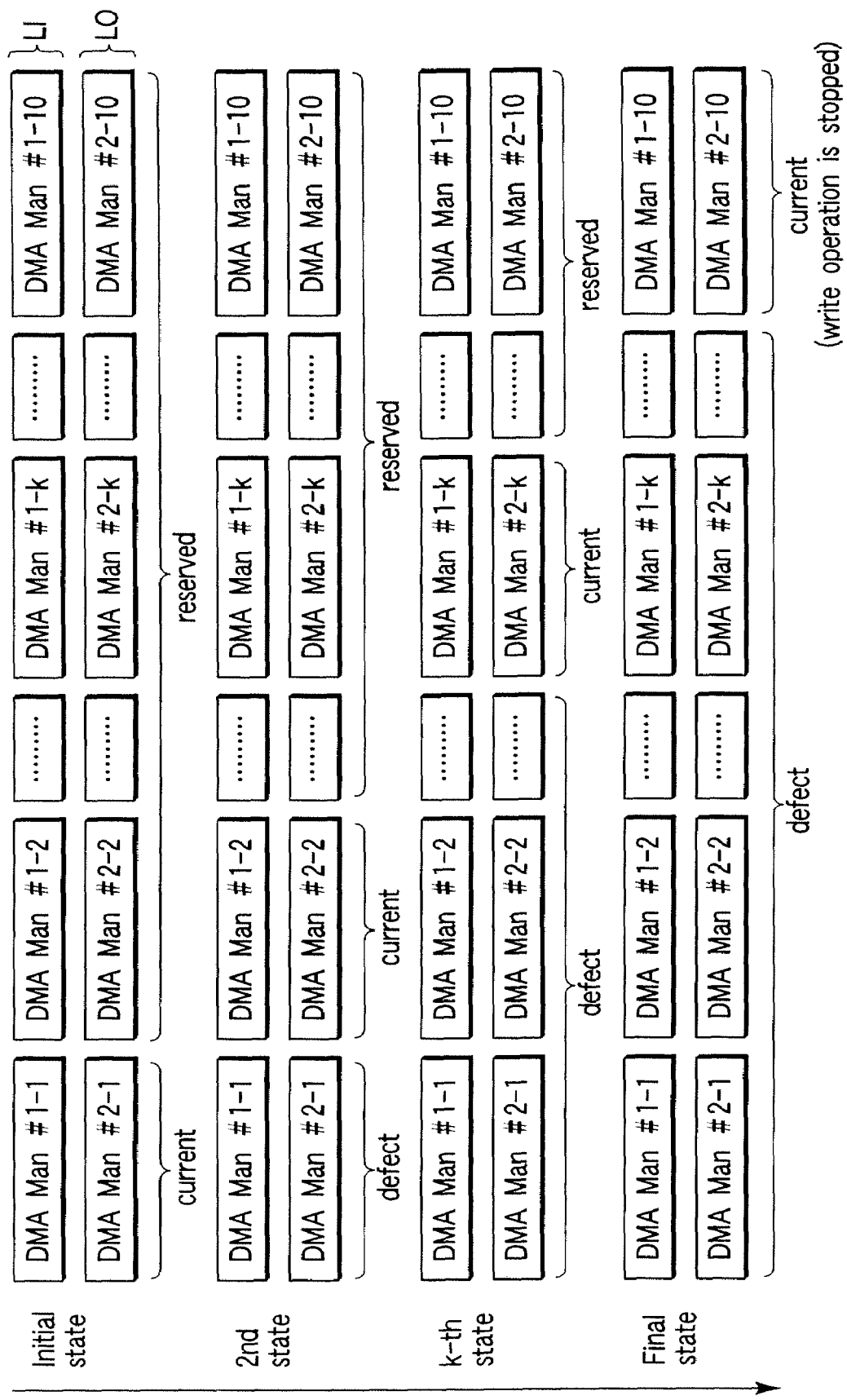
FIG. 23 shows an example of transition of DMA managers.

FIG. 23 shows transition of the DMA managers. The DMA managers also make transition as in the DMAs. That is, in the initial state, the latest DMA managers are stored in the head (first) manager reserved areas (DMA_Man#1-1, DMA_Man#2-1) of the respective manager storage areas (Man1, Man2). When one or more of the head manager reserved areas (DMA_Man#1-1, DMA_Man#2-1) in the manager storage areas fall under defective areas, the DMA managers are transited to the second manager reserved areas (DMA_Man#1-2, DMA_Man#2-2) in the manager storage areas. Likewise, transition of the DMA managers is made in turn. When the DMA managers reach the N-th manager reserved areas (DMA_Man#1-N, DMA_Man#2-N) in the manager storage areas, the recording operation is inhibited.

FIG. 24 shows DMA conditions. Normally, a DMA reserved area which is determined to fall under a defective area once should successively fall under a defective area. However, a DMA reserved area which is determined by accident (e.g., attachment of dust or the like) to fall under a defective area may be determined later not to fall under a defective area. That is, data may be correctly read out later from even a DMA reserved area which is determined to fall under a defective area once.

Normally, when the first DMA reserved area falls under a defective area, information must be transited. However, when the first DMA reserved area falls under a defective area due to some cause, defect management information may be transited to the third or fourth DMA reserved area. In such case, the second DMA reserved area is set in a reserved state. That is, the second DMA reserved area is determined as a blank area. In a normal state, defect management information can be correctly read out from the currently active DMA reserved area. However, in an abnormal state, the currently active DMA reserved area may fall under a defective area or may be a blank area. A determination error of a defective area often results in unwanted transition of the DMA reserved area. That is, the state of the DMA reserved area cannot be simply determined based on only the read-out state.

FIG. 25 shows the normal state of the DMA reserved areas. As shown in FIG. 25, for example, cases 1 to 5 are possible. As described above, the DMA sequences comprise a plurality of DMA reserved areas. The head DMA reserved areas (DMA set #1-1, DMA set #2-1, DMA set #3-1, and DMA set #4-1) of the plurality of DMA reserved areas are represented by "head", the last DMA reserved areas (DMA set #1-N, DMA set #2-N, DMA set #3-N, and DMA set #4-N) are represented by "tail", and some DMA reserved areas between the head and last DMA reserved areas are represented by "body".

Case 1 indicates an unformatted information storage medium. That is, all DMA reserved areas corresponding to "head", "body", and "tail" are in a reserved state.

Case 2 indicates an initialized information storage medium. That is, the DMA reserved areas corresponding to "head" are currently active, and those which correspond to "body" and "tail" are in a reserved state.

Case 3 indicates an information storage medium after DMA transition. That is, the DMA reserved areas corresponding to "head" are defective areas, predetermined DMA reserved areas of some DMA reserved areas corresponding to "body" are currently active areas, and DMA reserved areas after these currently active DMA reserved areas are in a reserved state.

Case 4 indicates an information storage medium in a final stage. That is, the DMA reserved areas corresponding to "head" and "body" are defective areas, and those which correspond to "tail" are currently active areas.

Case 5 indicates an unusable information storage medium. That is, all DMA reserved areas corresponding to "head", "body", and "tail" are defective areas.

Note that an identifier indicating a reserved state may be stored in an area in a reserved state so as to easily identify the reserved state.

The information recording/reproduction apparatus (main controller 20) of the present invention shown in FIG. 15 supports both a Table lookup scheme and Incremental scheme as a scheme for searching for the currently active DMAs. That is, the information storage medium of the present invention adopts a hybrid search format (HSF) that can apply both the Table lookup scheme and Incremental scheme. Normally, the main controller 20 searches for the currently active DMAs by the Table lookup scheme. The Table lookup scheme searches for the currently active DMAs based on the DMA managers. If the DMA managers cannot be read out, the main controller 20 searches for the currently active DMAs by the Incremental scheme. The Incremental scheme checks all DMA reserved areas contained in the DMAs in turn to search for the currently active DMAs. That is, the Incremental scheme is if the Table lookup scheme fails.

Figure 26:
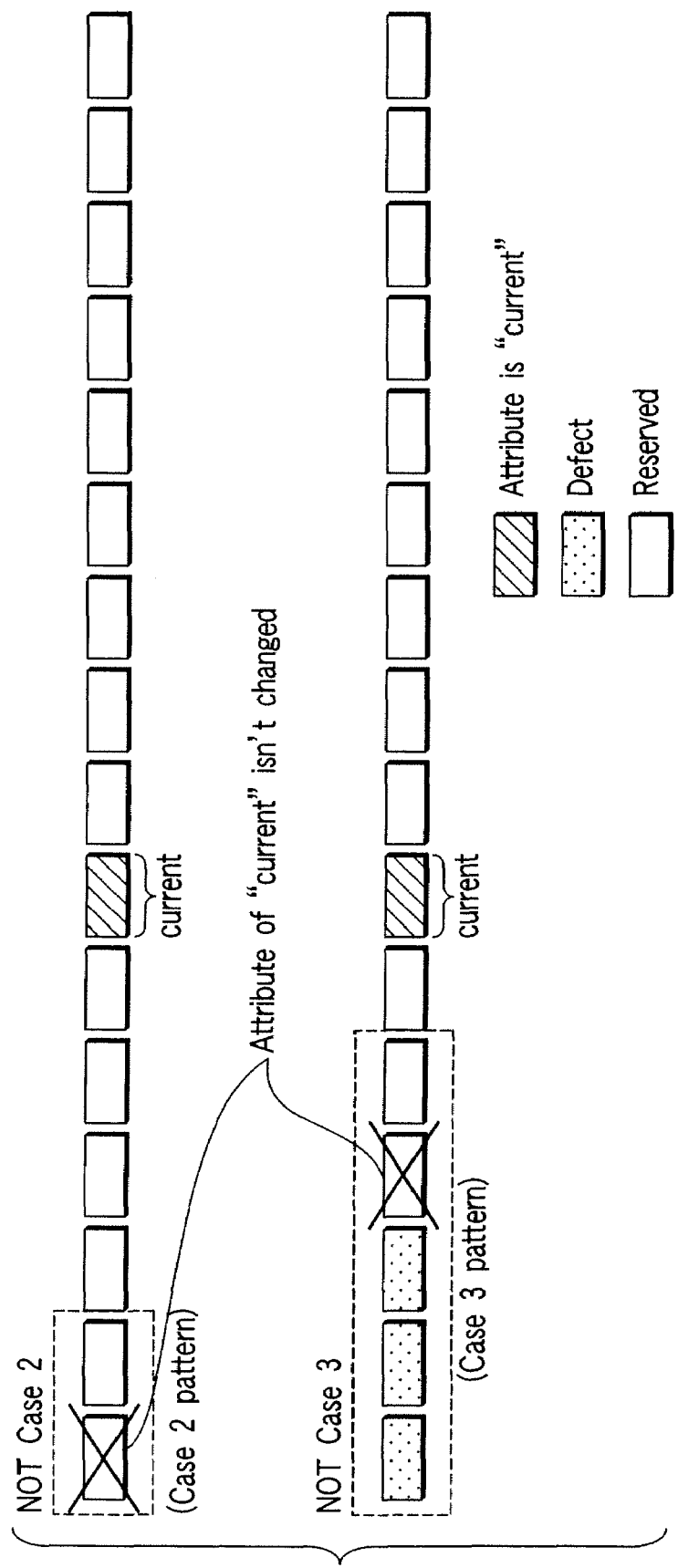
FIG. 26 is a view for explaining an example of an determination error of a DMA reserved area in an abnormal state.

As has been explained using FIG. 24, if the currently active DMA reserved areas are searched for using only the Incremental scheme, a determination error of the currently active DMA reserved areas may occur. FIG. 26 shows an example of a determination error of the DMA reserved areas in an abnormal state. For example, defect management information stored in the first (head) DMA reserved areas may be transited to the (2+α)-th DMA reserved areas after the second DMA reserved areas in some cases. Normally, defect management information stored in the first (head) DMA reserved areas must be transited to the second DMA reserved areas. However, when the second DMA reserved areas cannot be activated due to failures such as address errors or the like of the second DMA reserved areas, the (2+α)-th DMA reserved areas after the second DMA reserved areas are activated. However, if defect management information can be read out from, e.g., the first (head) DMA reserved areas after this transition, it is erroneously determined that the first (head) DMA reserved areas are currently active. In order to prevent such determination error, upon making a search by the Incremental scheme, a sufficiently large window width must be used in determination, resulting in a long determination time. Hence, the information recording/reproduction apparatus of the present invention preferentially uses the Table lookup scheme that allows high-speed search, and searches using the Incremental method only when the Table lookup scheme cannot find any currently active DMA reserved areas.

Figure 29:
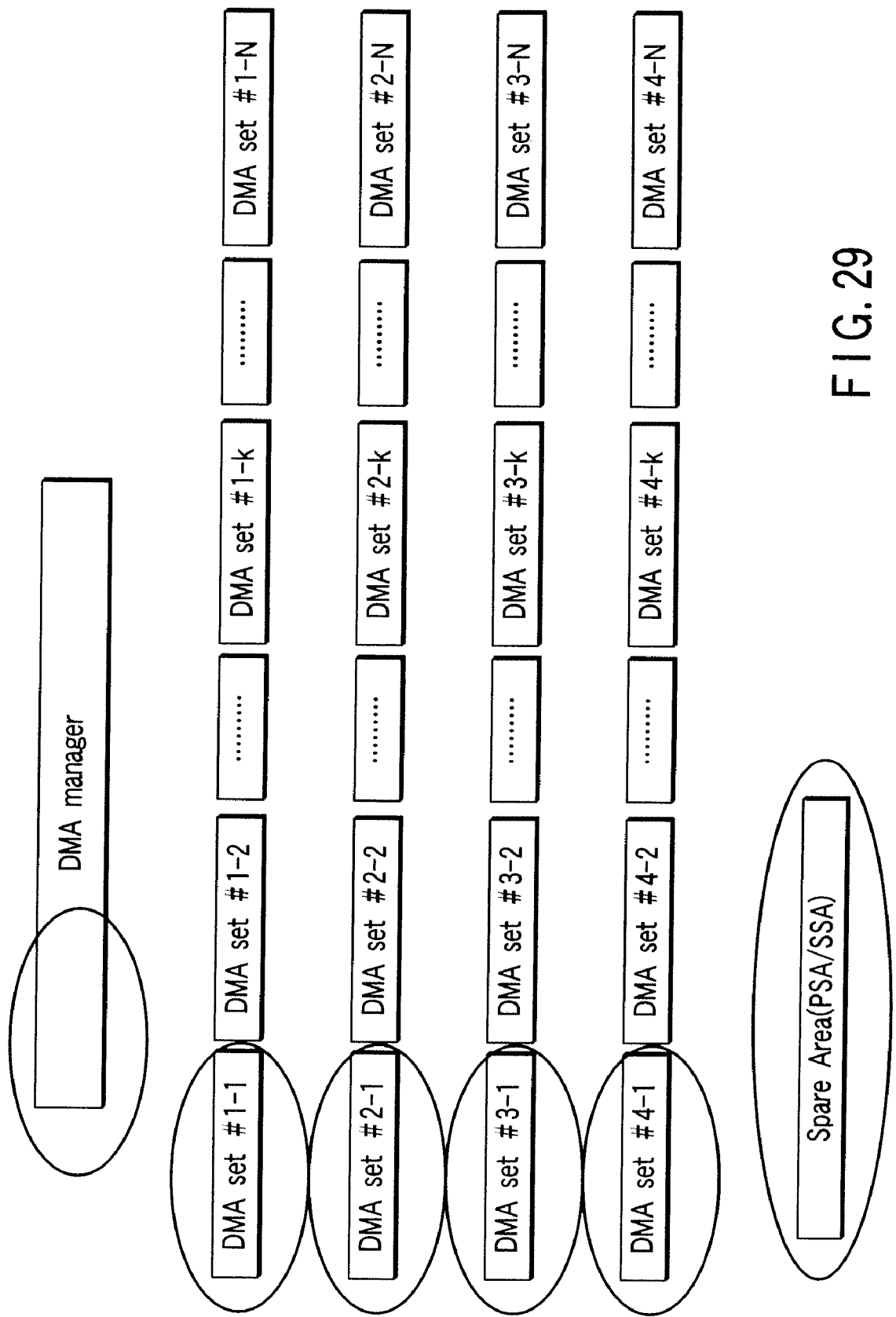
FIG. 29 show areas which must be rewritten upon execution of a replacement process.

FIG. 29 shows areas which must be rewritten upon a replacement process. For example, when it is determined that a predetermined area on the user area falls under a defective area, information to be recorded on this predetermined area is replacement-recorded on a spare area. As a result, the address of this predetermined area (replacement source) and that of the spare area (replacement destination) are recorded in the k-th DMA reserved areas of the respective DMA sequences (DMA sequence 1 to DMA sequence 4) as defect management information. The DMA managers are rewritten when DMA transition occurs. Therefore, the rewrite frequency of the DMA managers is low.

Figure 32:
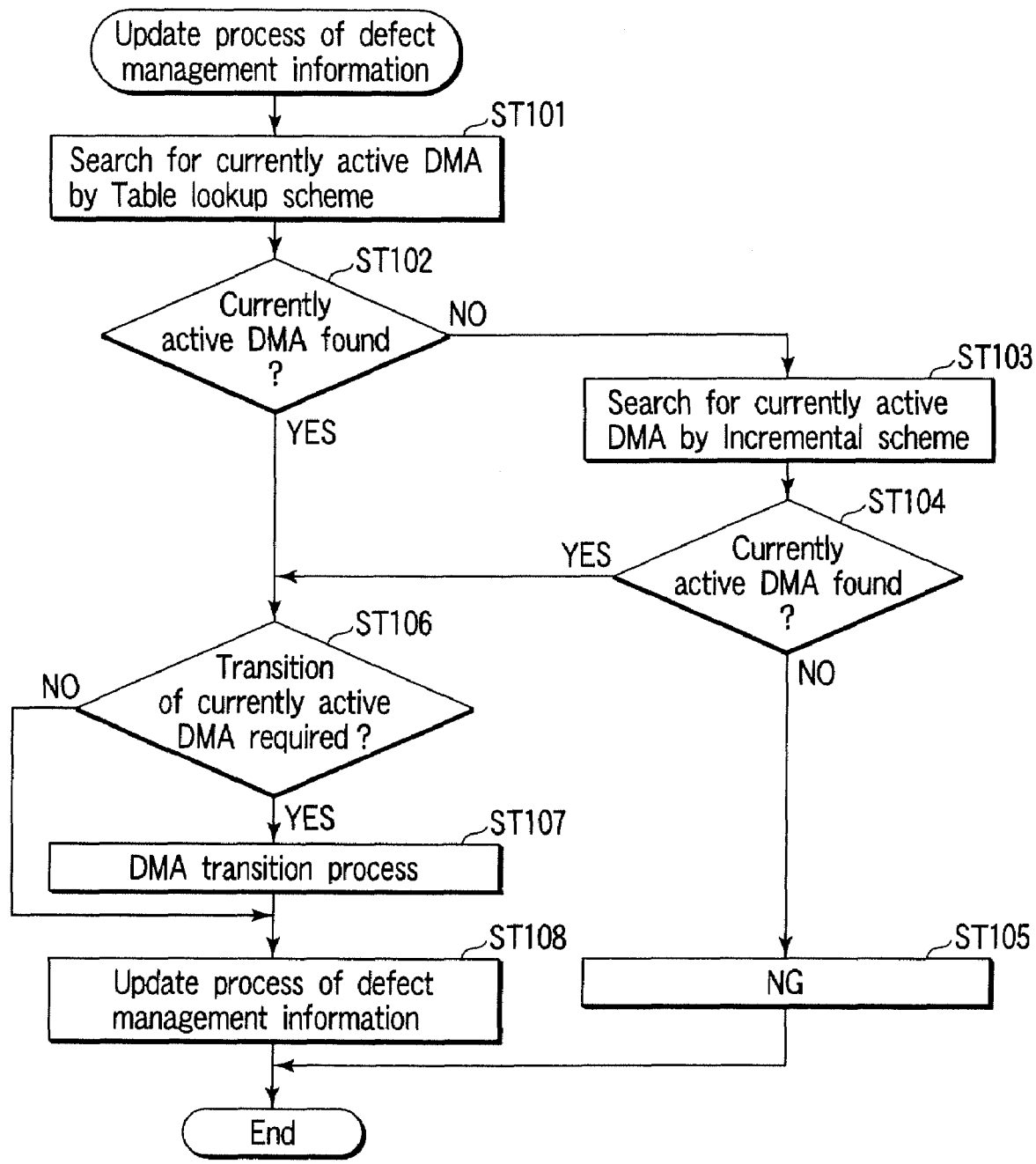
FIG. 32 is a flow chart showing an example of a DMA update process.

FIG. 32 is a flow chart showing an overview of the DMA update process. As shown in FIG. 32, the main controller 20 of the information recording/reproduction apparatus shown in FIG. 15 searches for the currently active DMA reserved areas by the Table lookup scheme (ST101). That is, if location information indicating the currently active DMA reserved areas can be read out from the latest DMA managers, the currently active DMA reserved areas can be found out (ST102, YES). If the main controller 20 cannot find any currently active DMA reserved areas by the Table lookup scheme (ST102, NO), it searches for the currently active DMA reserved areas by the Incremental scheme (ST103). If the main controller 20 cannot find any currently active DMA reserved areas by the Incremental scheme (ST104, NO), the DMA update process fails (ST105).

If the currently active DMA reserved areas are found (ST102, YES) (ST104, YES), the main controller 20 determines whether or not transition of the currently active DMA reserved areas is required (ST106). If at least one of the currently active DMA reserved areas falls under a defective area, the main controller 20 determines that transition of the currently active DMA reserved areas is required (ST106, YES).

If no transition is required (ST106, NO), the main controller 20 updates the defect management information stored in the currently active DMA reserved areas in correspondence with the replacement process (ST108). If transition is required (ST106, YES), the main controller 20 transfers defect management information stored in the currently active DMA reserved areas to new DMA reserved areas (next DMA reserved areas) (ST107), and updates the defect management information in correspondence with the replacement process (ST108).

FIG. 33 is a flow chart showing an overview of the DMA manager update process. The main controller 20 determines first whether or not transition of the current DMA managers is required (ST111). If at least one of the manager reserved areas that store the currently active DMA managers falls under a defective area, the main controller 20 determines that transition of the currently active DMA managers is required (ST111, YES). If transition is required (ST111, YES), the main controller 20 transfers the currently active DMA managers to new manager reserved areas (next manager reserved areas) (ST112). Also, if DMA transition has occurred (ST113, YES), the main controller 20 updates the DMA managers upon transition of the DMA (ST114).

Figure 34:
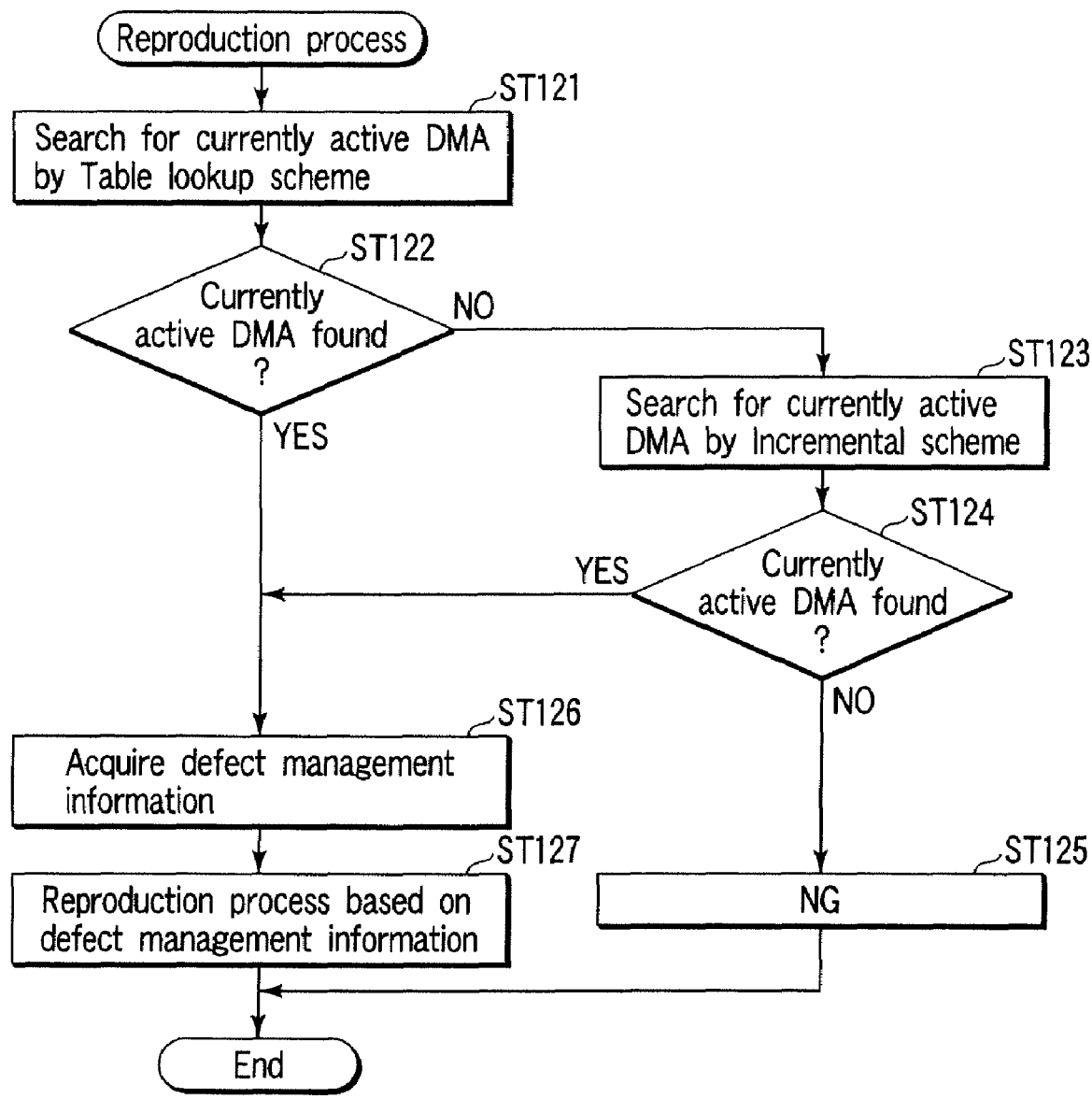
FIG. 34 is a flow chart showing an example of a reproduction process based on DMAs.

FIG. 34 is a flow chart showing an overview of the reproduction process based on the DMAs. As shown in FIG. 34, the main controller 20 of the information recording/reproduction apparatus shown in FIG. 15 searches for the currently active DMA reserved areas by the Table lookup scheme (ST121). That is, if location information indicating the currently active DMA reserved areas can be read out from the latest DMA managers, the currently active DMA reserved areas can be found out (ST122, YES). If the main controller 20 of the information recording/reproduction apparatus cannot find any currently active DMA reserved areas by the Table lookup scheme (ST122, NO), it searches for the currently active DMA reserved areas by the Incremental scheme (ST123). If the main controller 20 cannot find any currently active DMA reserved areas by the Incremental scheme (ST124, NO), the reproduction process fails (ST125).

If the currently active DMA reserved areas are found (ST122, YES) (ST124, YES), defect management information is read out from the currently active DMA reserved areas under the reproduction control of the main controller 20 (ST126). User data recorded on the user area is reproduced on the basis of the readout defect management information (ST127).

An ECC block made up of 64 KB will be explained below with reference to FIGS. 35 to 38. One ECC block recorded on an existing DVD-RAM is made up of 32 KB. In order to realize higher-density recording than the existing DVD-RAM, an ECC block made up of 64 KB will be explained.

FIG. 35 shows the data structure of an ECC block. The ECC block is made up of 32 successive scrambled frames. 192 rows+16 rows (column direction) and (172+10)×2 columns (row direction) are arranged. Each of B0,0, B1,0, . . . is one byte. PO and PI are error correction codes, i.e., parity data of outer-codes and parity data of inner-codes.

In the ECC block shown in FIG. 35, a (6 rows×172 bytes) unit is handled as one scrambled frame. FIG. 36 shows the scrambled frame allocation obtained by rewriting FIG. 35. That is, the ECC block is formed of 32 successive scrambled frames. Furthermore, this system handles (block 182 bytes× 207 bytes) as a pair. If L is assigned to respective scrambled frame numbers in the left ECC block, and R is assigned to those in the right ECC block, scrambled frames are allocated, as shown in FIG. 36. That is, left and right scrambled frames alternately appear in the left block, and right and left scrambled frames alternately appear in the right block.

That is, the ECC block is formed of 32 successive scrambled frames. Respective rows on the left half of an odd sector are replaced by those on the right half. 172×2 bytes× 192 rows are equal to 172 bytes×12 rows×32 scrambled frames to form an information field. 16-byte PO data is appended to 172×2 columns to form outer code RS (208, 192, 17). Also, 10-byte PI (RS(182, 172, 11)) data is appended to 208×2 rows of the right and left blocks. PI data is also appended to PO rows.

Numerals in frames indicate scrambled frame numbers, and suffices R and L indicate the right and left halves of the scrambled frames. PO and PI data shown in FIG. 35 are generated in the following sequence.

Initially, a 16-byte $B_{i,j}$ (i=192 to 207) is appended to column j (j=0 to 171 and j=182 to 353). This $B_{i,j}$ is defined by polynomial Rj(x), which forms outer code RS (208, 192, 17) for 172×2 columns.

Next, 10-byte $B_{i,j}$ (j=172 to 181 and j=354 to 363) is appended to row i (i=0 to 207). This $B_{i,j}$ is defined by polynomial Ri(X), which forms inner code RS (182, 172, 11) for (208×2)/2 rows.

Figure 37:
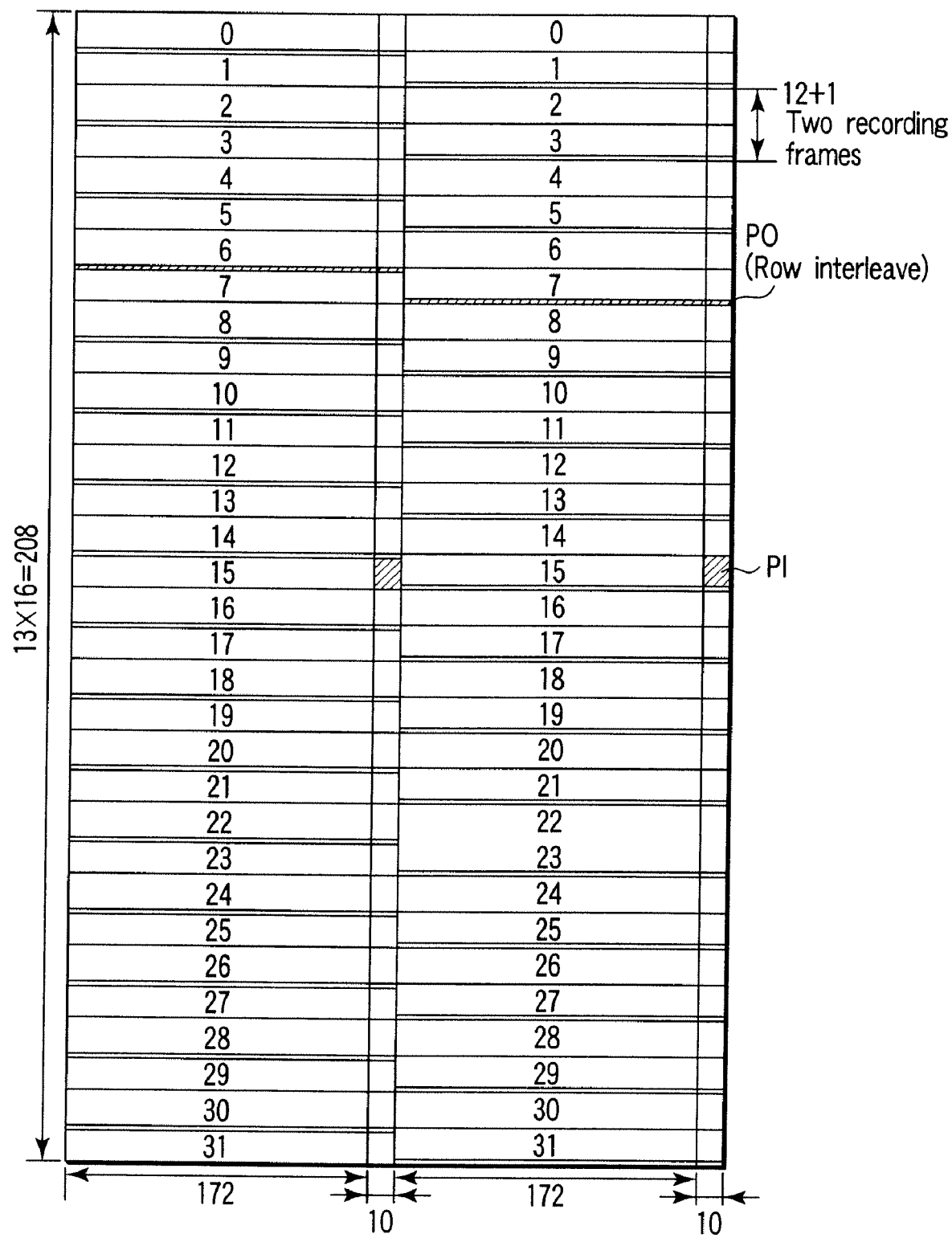
FIG. 37 shows an example of the data structure of an interleaved ECC block.

FIG. 37 shows the state wherein parity data of outer-codes (PO) are interleaved to the left and right blocks in the ECC block. $B_{i,j}$ as elements of a B matrix shown in FIG. 35 form 208 rows×182×2 columns. This B matrix is interleaved between neighboring rows so that $B_{i,j}$ are re-allocated as $B_{m,n}$.

As a result, 16 parity rows are distributed one by one, as shown in FIG. 37. That is, each of 16 parity rows is allocated for every two recording frames. Therefore, a recording frame consisting of 12 rows has 12 rows+1 row. After this row interleave, 13 rows×182 bytes are referred to as a recording frame. Therefore, the ECC block after row interleave is made up of 32 recording frames. In one recording frame, six rows are present in each of the right and left blocks, as described in FIG. 36. Also, PO is allocated at different rows in the left block (182×208 bytes) and right block (182×208 bytes). FIG. 36 shows one complete ECC block. However, in actual data reproduction, such ECC blocks are successively input to an error correction processor. In order to improve the correction performance of such error correction process, the interleave scheme shown in FIG. 37 is adopted.

FIG. 38 shows an example of the configuration of recorded data fields (even and odd fields). In FIG. 38, PO (Parity Out) information shown in FIG. 37 is inserted in sync data areas in the last two sync frames (i.e., portions where the last "sync code=SY3" portion and subsequent "sync data", and "sync code=SY1" portion and subsequent "sync data" are juxtaposed) in each of the even and odd recorded data fields.

More specifically, "part of left PO" shown in FIG. 36 is inserted in the last two sync frames in the even recorded data field, and "part of right PO" shown in FIG. 36 is inserted in the last two sync frames in the odd recorded data field. As shown in FIG. 36, one ECC block is formed of right and left "small ECC blocks", and data of different PO groups (PO belonging to the left small ECC block or PO belonging to the right small ECC block) are alternately inserted for respective sectors.

The functions and effects of the aforementioned second defect management method will be summarized below.

For example, assume that an information storage medium of the present invention allows up to 1000 overwrite accesses. On this information storage medium, registration of 10000 cases of defect management information is realized. In this case, if DMAs are transited every 1000 accesses, the medium can proof registration of 10000 cases of defect management information by 10 (=10000/1000) transitions in principle. That is, by allowing the DMA replacement process, poor overwrite characteristics can be overcome.

On a conventional medium, a DMA itself does not undergo defect management. For this reason, when the rewrite count of defect management information becomes larger than the repetitive recordable count, satisfactory defect management is disabled in practice. For example, in the case of an information storage medium that allows about only 1000 overwrite accesses, the DMA itself is likely to be defective by 1000 or more rewrite accesses of defect management information. Some information storage media in the market have poor quality. In the case of such a medium, defective blocks are formed after about only 100 overwrite accesses. In such an inferior medium, some defects disable the whole medium.

With the second defect management method to be summarized below, the performance of an information storage medium that allows about only 1000 overwrite accesses can be remarkably improved.

Target
Maximum OW times: 100,000
Presupposition
OW limitation of single DMA: 1,000
Solution
Plural DMAs with transition
Number of DMA: 100,000/1,000=100 set
Four identical DMAs According to defect management of the present invention, the apparent overwrite characteristics of a medium that allows about only 1000 overwrite accesses can be improved. For example, about 100000 overwrite accesses are allowed. This value is equivalent to the overwrite count of a DVD-RAM. An area that has undergone 1000 overwrite accesses is replaced by a new area. In principle, 100 (=100000/1000) sets of DMA reserved areas need only be prepared. When a medium has 100 sets of DMA reserved areas, even a medium that allows about only 1000 overwrite accesses can have performance equivalent to that of a medium that allows about 100000 overwrite accesses. The medium has, e.g., two DMA sequences with identical contents on the lead-in area, and two DMA sequences on the lead-out area, i.e., a total of four DMA sequences. As a result, even when information cannot be read out from an arbitrary DMA sequence, if information can be read out from other DMA sequences, correct defect management can continue. That is, a plurality of DMA sequences which can be used at the same time are provided, and when individual DMA sequences deteriorate, defect management information is transferred to new DMA reserved areas. As a result, performance for protecting the DMA itself from failures can be improved. For example, when four DMA sequences are simultaneously allocated on a medium, each DMA sequence has 100 DMA reserved areas. That is, a total of 400 DMA reserved areas need only be prepared on the medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information reproduction apparatus for reproducing information from an information storage medium, including a read-in area; a data area consisting of blocks; and a read-out area, wherein the data area includes a user area and a spare area, a defective block of the blocks is replaced by a spare block of the spare area, the read-in area and the read-out area include defect management area sets to be used in due order, each defect management area set includes first, second, third, and fourth defect management areas to store defect management information, the read-in area includes the first and second defect management areas of each defect management area set, the read-out area includes the third and fourth defect management areas of each defect management area set, wherein upon detection of a defect in a current defect management area set included in the defect management area sets, the current defect management area set is replaced to the next defect management area set of the current defect management area set, the second defect management area is the next defect management area of the first defect management area, and the fourth defect management area is the next defect management area of the third defect management area, the apparatus comprising:

a reading unit configured to read information from the information storage medium, wherein the reading unit reads the latest defect management information from the current defect management area set.

2. An information recording apparatus for recording information on an information storage medium including a read-in area; a data area consisting of blocks; and a read-out area, wherein the data area includes a user area and a spare area, a defective block of the blocks is replaced by a spare block of the spare area, the read-in area and the read-out area include defect management area sets to be used in due order, each defect management area set includes first, second, third, and fourth defect management areas to store defect management information, the read-in area includes the first and second defect management areas of each defect management area set, the read-out area includes the third and fourth defect management areas of each defect management area set, wherein upon detection of a defect in a current defect management area set included in the defect management area sets, the current defect management area set is replaced to the next defect management area set of the current defect management area set, the second defect management area is the next defect management area of the first defect management area, and the fourth defect management area is the next defect management area of the third defect management area, the apparatus comprising:

a detecting unit configured to detect the defect in the current defect management area set; and a replacing unit configured to replace the current defect management area set with the next defect management area set upon the detection of the defect in the current defect management area set.

* * * * *